United States Patent
Nakata

(10) Patent No.: US 10,929,706 B2
(45) Date of Patent: Feb. 23, 2021

(54) IMAGE PROCESSING DEVICE AND PROJECTION SYSTEM

(71) Applicant: Otoichi Nakata, Kanagawa (JP)

(72) Inventor: Otoichi Nakata, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 78 days.

(21) Appl. No.: 16/292,552

(22) Filed: Mar. 5, 2019

(65) Prior Publication Data

US 2019/0286933 A1  Sep. 19, 2019

(30) Foreign Application Priority Data

Mar. 19, 2018 (JP) .................. 2018-051816

(51) Int. Cl.
*G06K 9/46* (2006.01)
*G06T 7/30* (2017.01)
(Continued)

(52) U.S. Cl.
CPC .............. *G06K 9/4671* (2013.01); *G06T 7/30* (2017.01); *G06T 7/33* (2017.01); *H04N 9/3185* (2013.01);
(Continued)

(58) Field of Classification Search
CPC ........... G06K 9/4671; G06T 7/30; G06T 7/33; H04N 9/3185
See application file for complete search history.

(56) References Cited

U.S. PATENT DOCUMENTS

2012/0114213 A1* 5/2012 Buelow .................. G06T 7/344
382/131
2013/0342816 A1* 12/2013 Furui .................. G03B 21/147
353/69
(Continued)

FOREIGN PATENT DOCUMENTS

JP 2009-522005 6/2009
JP 5632913 11/2014
(Continued)

OTHER PUBLICATIONS

Unlu, M. et al., "Cmputerized method for nonrigid MR-to-PET breat-image registration," Computer in Biology and Medicine, vol. 40, No. 1, pp. 37-53, Jan. 1, 2010.
(Continued)

*Primary Examiner* — Md K Talukder
(74) *Attorney, Agent, or Firm* — Harness, Dickey & Pierce, P.L.C.

(57) ABSTRACT

An image processing device extracts, for a target area that has sites having different flexibilities and where markers corresponding to the respective flexibilities are put on the sites, marking positions where the markers are put according to each type of the markers from each of a first image to be projected and being an image of the target area captured in advance and a second image being an image of the target area captured before projection of the first image; executes, based on the extracted marking positions according to each type of the markers, image processing to align the marking positions of the markers contained in the first image with the marking positions of the markers contained in the second image by a processing method corresponding to the types of the markers; and generates, based on the processed first image, a projection image to be projected onto the target area.

10 Claims, 15 Drawing Sheets

(51) Int. Cl.
  *H04N 9/31* (2006.01)
  *G06T 7/33* (2017.01)
(52) U.S. Cl.
  CPC .......... *G06T 2207/10072* (2013.01); *G06T 2207/20016* (2013.01); *G06T 2207/30004* (2013.01)

(56) References Cited

U.S. PATENT DOCUMENTS

| | | | | |
|---|---|---|---|---|
| 2015/0043794 | A1* | 2/2015 | Tahmasebi Maraghoosh | ........... G06T 3/0068 382/128 |
| 2015/0198797 | A1* | 7/2015 | Andre | ........... G02B 21/16 348/80 |
| 2015/0228093 | A1* | 8/2015 | Miyasa | ........... G06T 11/60 382/131 |
| 2016/0302747 | A1 | 10/2016 | Averbuch | |
| 2017/0319165 | A1 | 11/2017 | Averbuch | |
| 2019/0286933 | A1* | 9/2019 | Nakata | ........... G06K 9/4671 |

FOREIGN PATENT DOCUMENTS

| | | |
|---|---|---|
| JP | 6207534 | 11/2014 |
| JP | 2015-220661 | 12/2015 |
| JP | 2016-142991 | 8/2016 |
| JP | 2017-502807 | 1/2017 |
| JP | 2017-060778 | 3/2017 |
| JP | 2017-192040 | 10/2017 |

OTHER PUBLICATIONS

Dadashi, S. et al., "A projected landmark method for reduction of registration error in image-guided surgert systems," International Journal of Computer Assisted Radiology and Surgery, vol. 10, No. 5, pp. 541-554, May 28, 2014.
Backman, R. et al., :Registration of anatomic landmarks during respiration using ultraviolet and structured lighting, Biomedical Visualization, pp. 42-49, Oct. 30, 1995.
Extended European Search Report dated Aug. 20, 2019.

* cited by examiner

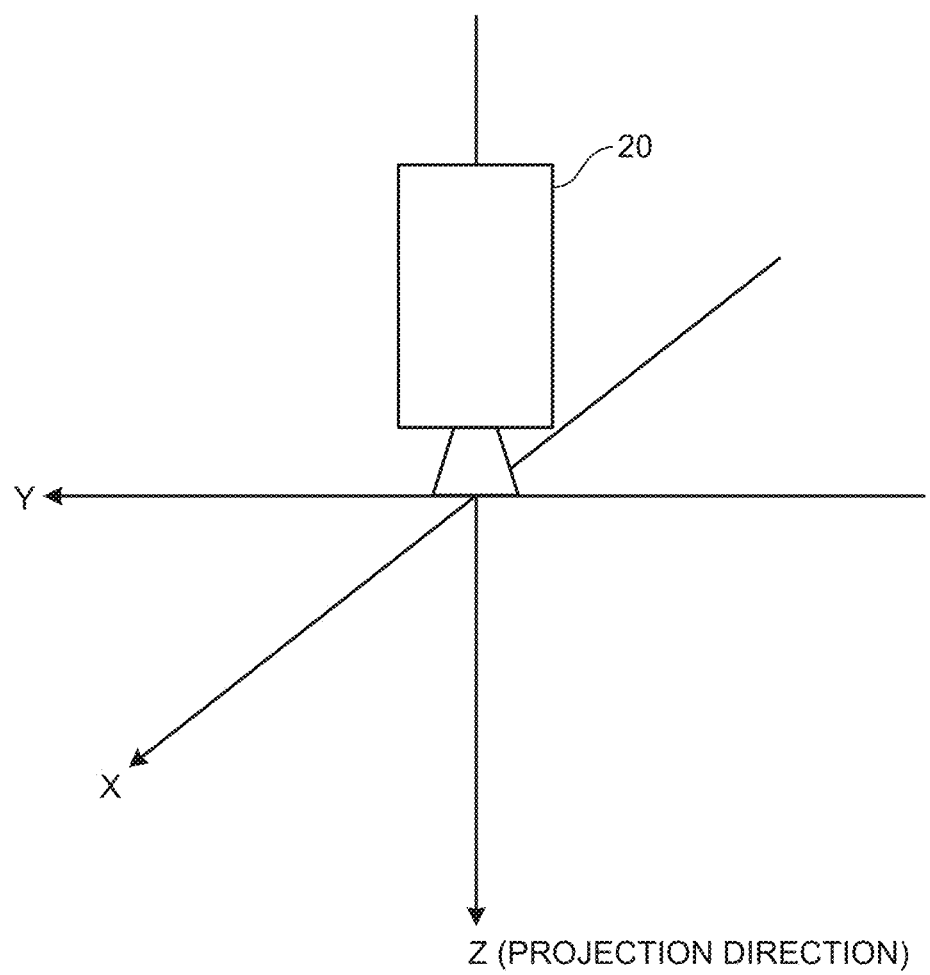

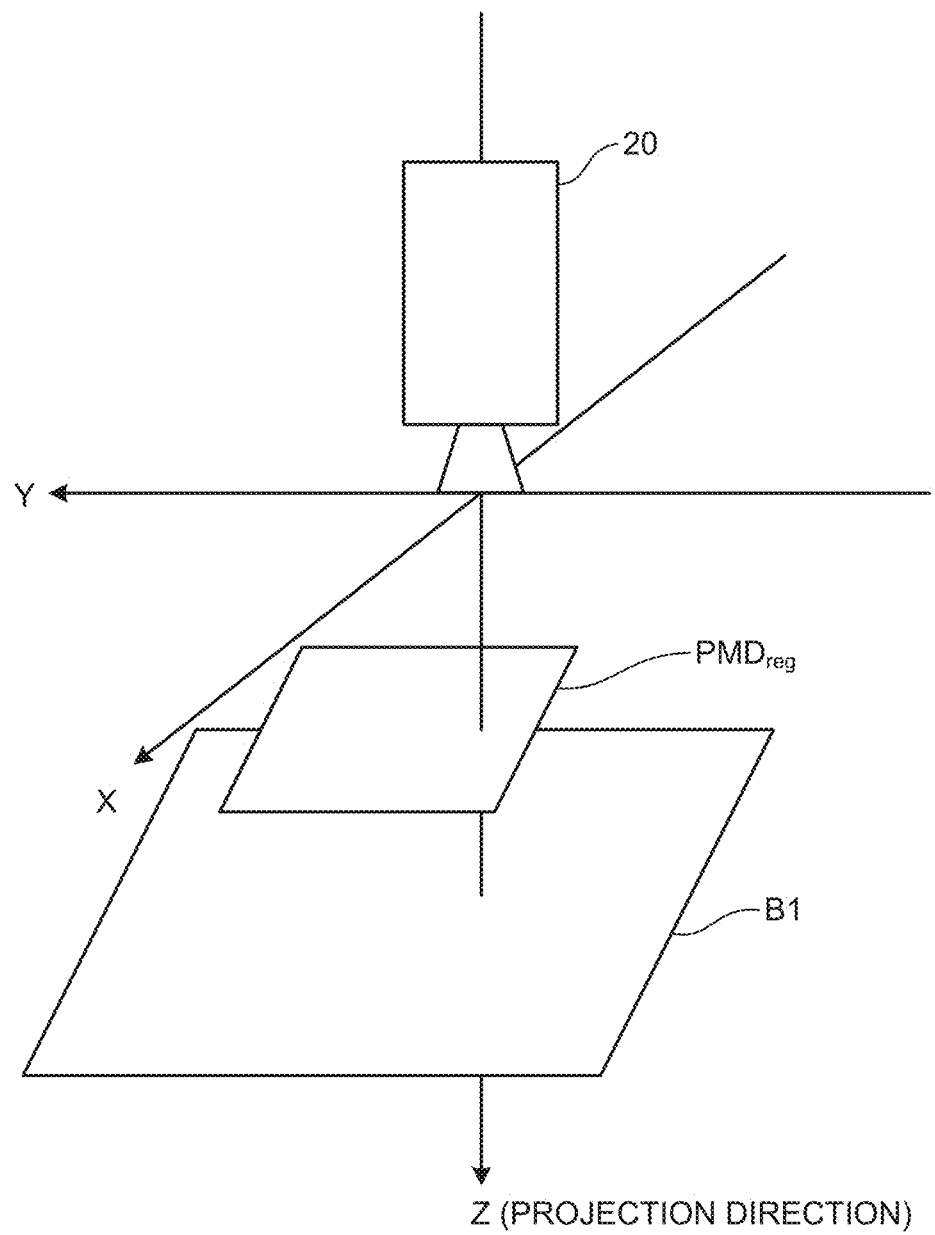

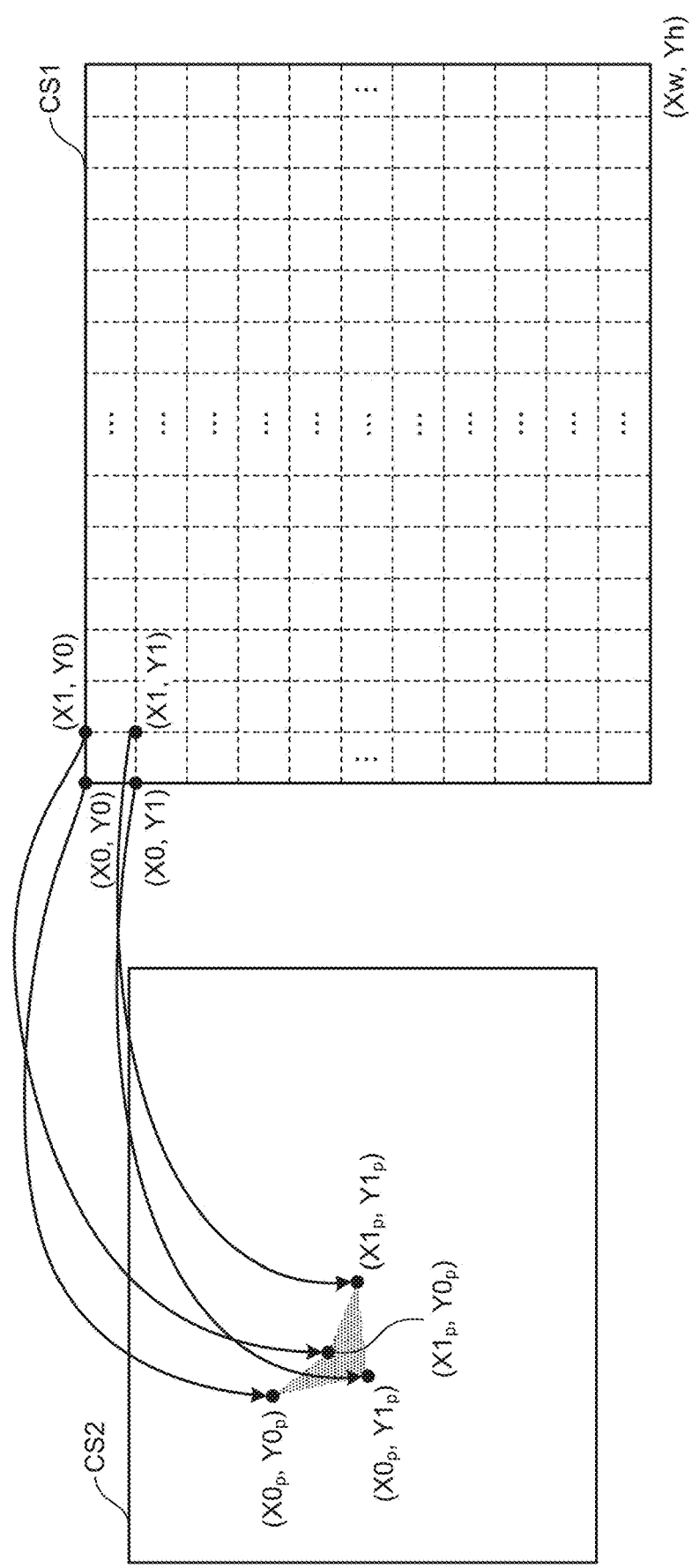

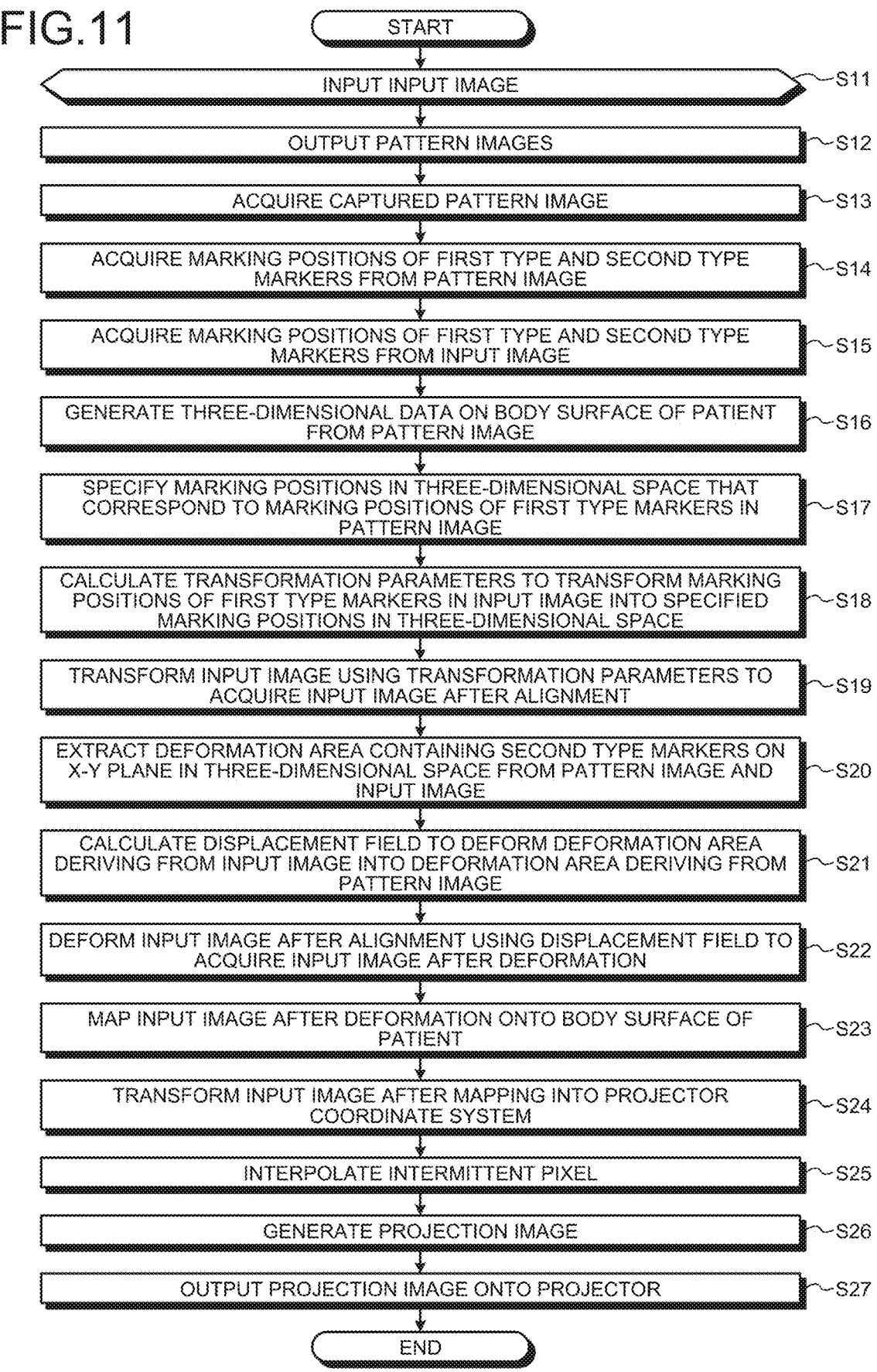

IMAGE PROCESSING DEVICE AND PROJECTION SYSTEM

CROSS-REFERENCE TO RELATED APPLICATIONS

The present application claims priority under 35 U.S.C. § 119 to Japanese Patent Application No. 2018-051816, filed on Mar. 19, 2018. The contents of which are incorporated herein by reference in their entirety.

BACKGROUND OF THE INVENTION

1. Field of the Invention

Embodiments relate to an image processing device and a projection system.

2. Description of the Related Art

A technology called projection mapping to project an image (video) onto a three-dimensional structure, such as a building, using a projection device, such as a projector, is used in various fields. In projection mapping, it is required to project an image according to the shape of a three-dimensional object such that no misalignment or distortion is caused.

For example, there is a proposed technology to align a three-dimensional object and an image to be projected with each other using data of a two dimensional image of an object (three-dimensional structure) that is a projection target onto which a projection is made and that is viewed from the viewpoint of a projection device and using a two-dimensional image that is generated from three-dimensional data of the projection device (Japanese Unexamined Patent Application Publication No. 2017-192040)

Projection mapping described above is also used to project a modality image of a patient that is captured with a modality, such as a computerized tomography (CT) machine or a magnetic resonance imaging (MRI) machine, onto the body surface of the patient.

When a modality image is projected by projection mapping, however, the projection target onto which the modality image is projected is a non-rigid human body and thus there is a possibility that the shape of a site may change between the time when the modality image is captured and the time when the modality image is projected. For example, when an area of which image is captured (projection target) contains a site (breasts, or the like) that has a lot of subcutaneous fat and thus is flexible, even when the same posture as that at the time when the modality image is captured is reproduced at projection, the shape of the site may differ. Note that the conventional technology is an alignment technology to make a projection onto a rigid object, such as a building, and therefore it is difficult to apply the technology to making a projection onto a non-rigid object.

The present invention was made in view of the above-described circumstances and an object of the present invention is to provide an image processing device and a projection system enabling generation of a projection image preferable to projection mapping onto a non-rigid object.

SUMMARY OF THE INVENTION

According to an embodiment, an image processing device includes a marking information extractor, an image processor, and a projection image generator. The marking information extractor extracts, for a target area that has a plurality of sites having different flexibilities and in which a plurality of markers of types corresponding to the respective flexibilities are put on the sites, marking positions in which the markers are put according to each of the types of the markers from each of a first image that is to be projected and that is an image of the target area that is captured in advance and a second image that is an image of the target area that is captured before projection of the first image. The image processor executes, based on the extracted marking positions according to each of the types of the markers, image processing to align the marking positions of the markers that are contained in the first image with the marking positions of the markers that are contained in the second image by a processing method corresponding to the types of the markers. The projection image generator generates, based on the first image after the image processing, a projection image to be projected onto the target area.

BRIEF DESCRIPTION OF THE DRAWINGS

FIG. 6 is a diagram for explaining a coordinate system of three-dimensional data according to the first embodiment;

FIG. 9 is a diagram of a relationship between a post-deformation coordinate group and the body surface of a patient according to the first embodiment;

FIG. 10 is a diagram of a relationship between a coordinate system of the post-deformation coordinate group and a projector coordinate system according to the first embodiment;

FIG. 11 is a flowchart of exemplary image processing that is executed by the image processing device according to the first embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
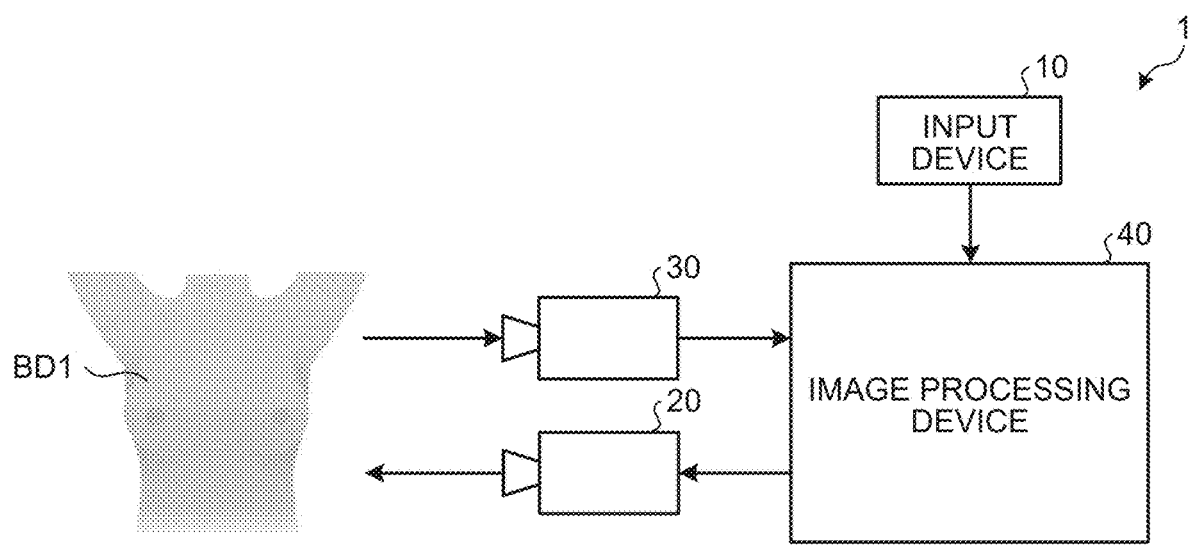
FIG. 1 is a diagram of an exemplary system configuration of a projection mapping system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Embodiments of an image forming apparatus and a projection system will be described in detail below with reference to the accompanying drawings. The following embodiments do not limit the present invention and the components of the following embodiments include those easily reached by those skilled in the art and those substantially the same and those within the range of so-called equivalents. It is possible to make various types of omission, replacement, change and combination without departing from the scope of the following embodiments.

First Embodiment

FIG. 1 is a diagram of an exemplary configuration of a projection system 1 according to a first embodiment. The projection system 1 projects a modality image of a patient that is captured with a modality, such as a computerized tomography (CT) machine or a magnetic resonance imaging (MRI) machine, onto the body surface of the patient (performs projection mapping), for example, when the patient undergoes a surgical operation.

The projection system 1 according to the embodiment includes an input device 10, a camera 30, a projector 20, and an image processing device 40.

The input device 10 is an exemplary input unit. The input device 10 inputs a modality image that is captured with a modality to the image processing device 40 as an input image to be projected. The input device 10 includes the modality, such as a CT machine or an MRI machine, and a database that stores and manages the modality image that is captured with the modality. The input device 10 is, for example, a scanner device that, for example, reads the modality image that is recorded with a film medium, or the like.

The modality image is data of an image into which in-vivo information of a patient that is captured with the modality, such as a CT machine or an MRI machine, is converted. The modality image is captured according to a direction in which a projection is to be made. For example, when an image of the patient in a supine position is captured and the image is projected from right above the patient in a supine position, a maximum intensity projection (MIP) image based on a viewpoint right above the patient is prepared as a modality image. When the image is projected in an oblique direction at 30 degrees with respect to the patient in a supine position, an MIP image based on a viewpoint in an oblique direction at 30 degrees is prepared as a modality image. When a dye method for breast-conserving surgery is used, an MIP image aligned with a direction in which a hue injection needle is inserted is used as a modality image. To simplify the explanation, the embodiment will be described as one where a target area of which image is to be captured and onto which the image is to be projected is the chest (around the breasts) and image capturing and projection based on a viewpoint right above the target area are performed.

A modality image contains marking information representing the positions and types of markers that are put onto the body surface of a patient at image capturing. When the modality image is captured, the markers are put by a doctor or a technologist to the body surface of the patient in corresponding sites. Multiple types of markers are used differently according to the characteristics of the sites (flexibility).

FIG. 2 is a diagram of exemplary markers according to the first embodiment. FIG. 2 illustrates exemplary markers that are put on a body surface BD1 of the patient (around the breasts). FIG. 2 illustrates an example where two types of markers that are first type markers M1 and second type markers M2 are used.

The first type markers M1 are put on a non-varying site with low flexibility, such as a site with less sagging and subcutaneous fat (corresponding to the thoracic vertebra appearing in MRI imaging, or the like). On the other hand, the second type markers M2 are put on a varying site, such as a site with a lot of sagging and subcutaneous fat, with flexibility higher than that of the non-varying site on which the first type markers M1 are put.

Figure 2A:
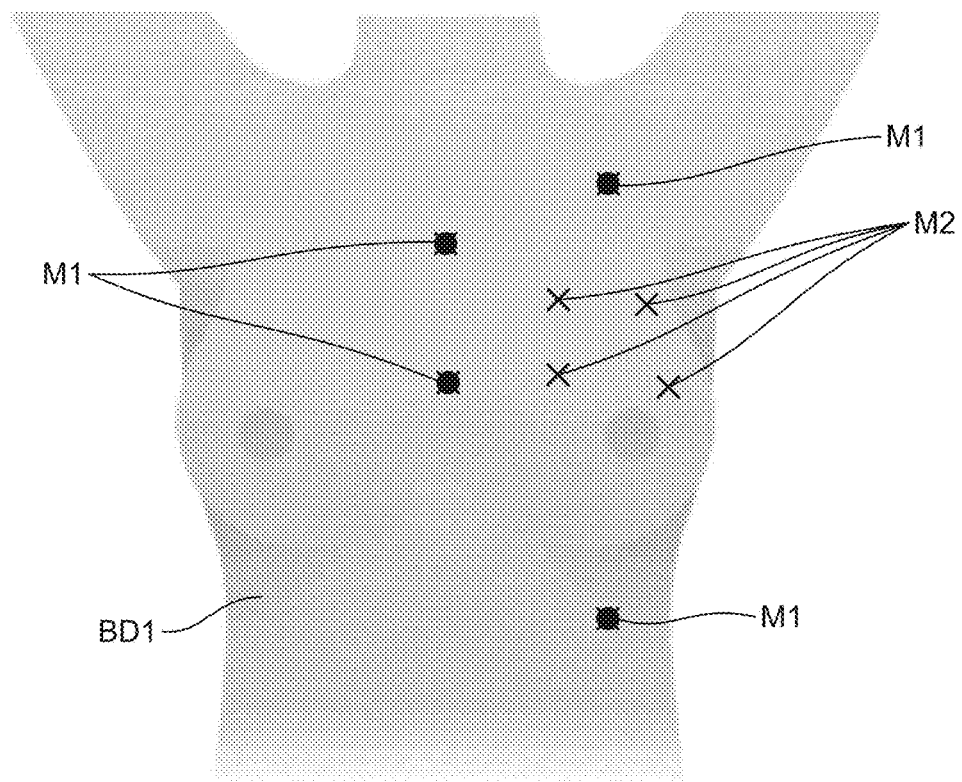
FIGS. 2A and 2B are diagrams of exemplary markers according to the first embodiment.
Figure 2B:
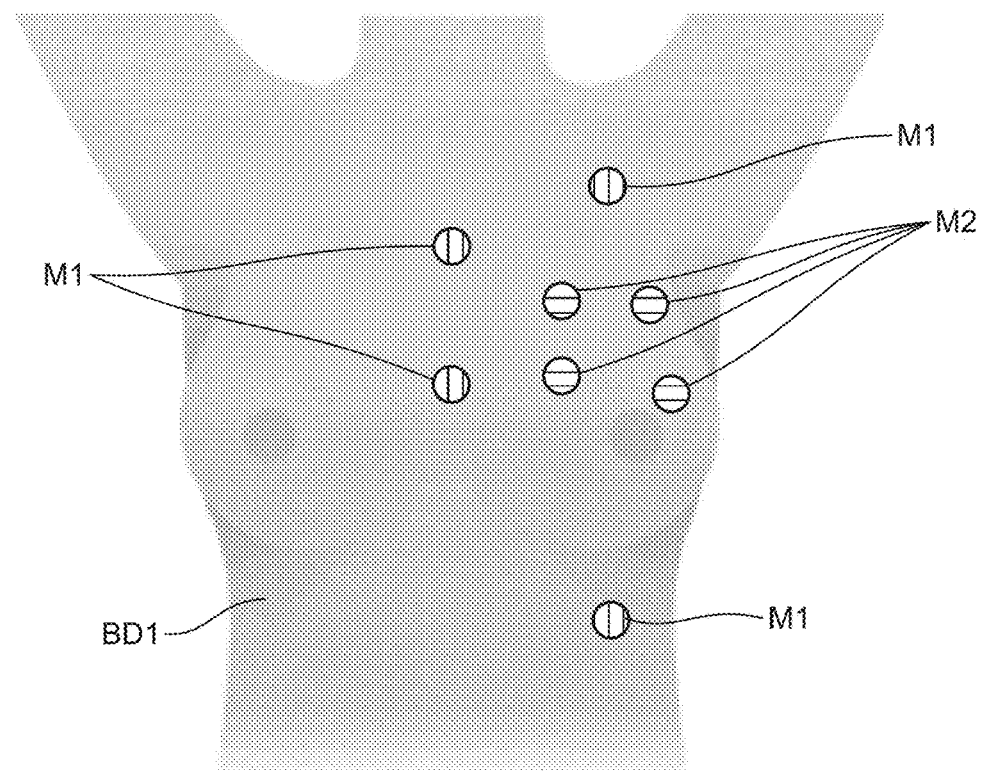

It suffices if the first type markers M1 and the second type markers M2 can be identified, and the first type markers M1 and the second type markers M2 can be represented by different colors, shapes, patterns, characters, or the like. FIG. 2A illustrates an example where the first type markers M1 and the second type markers M2 are different in shape (the first type markers M1 have the shape of "0" and the second type markers M2 have the shape of "x"). FIG. 2B illustrates an example where the first type markers M1 and the second type markers M2 are different in color (for example, the first type markers M1 are "green" and the second type markers M2 are "blue"). In this case, it is preferable that the first type markers M1 and the second type markers M2 be colors that can be differentiated from the color of the skin of the patient.

For example, when the markers (the first type markers M1 and the second type markers M2) are put using a medical skin marker pen including an ink that appears in the modality image, the marking positions in which the markers are put and the types (color and shape) of the markers are recorded as the marking information on the modality image. It is preferable that lasting ink that remains on the surface of the body until projection (for example, a surgical operation) be used for the markers.

When the markers that are put on the body surface of the patient do not appear in the modality image, for example, it suffices if marking information be recorded according to the following procedure. First of all, marking positions are determined on the body surface of the patient. Contrast markers containing a contrast agent are attached onto the marking positions and an image is captured with a modality. Accordingly, the marking positions of the contrast markers are recorded on the captured modality image. The corresponding types (color and shape) of the first type markers M1 and the second type markers M2 are recorded in the marking positions on the modality image electrically or by using a skin marker pen.

The marking information may be stored separately from the modality image. In this case, the marking information contains information in which the types of the markers and the marking positions of the markers on the modality image are associated with each other (marking position coordinates) and the marking information is input as an input image to the image processing device 40 together with the corresponding modality image.

The projector 20 is an exemplary projection unit. The projector 20 is a projector device that makes a projection onto an object that is a projection target onto which a projection is made (performs projection mapping). The projector 20 projects various types of image data that are input from the image processing device 40 onto the body surface BD1 of the patient serving as a projection target. The projection target is not limited to the body surface BD1 and may include an area around the body surface BD1. In this case, an input image (projection image) that is aligned based on the first type markers M1 and the second type markers M2 is projected onto the area of the body surface BD1 and the input image (projection image) that is aligned based on the first type markers M1 is projected onto the area around the body surface BD1.

The camera 30 is an exemplary image capturing unit. The camera 30 is an image capturing device, such as a video camera or a digital camera, capable of capturing color images. The camera 30 outputs image data that is obtained by capturing an image to the image processing device 40.

Figure 3:
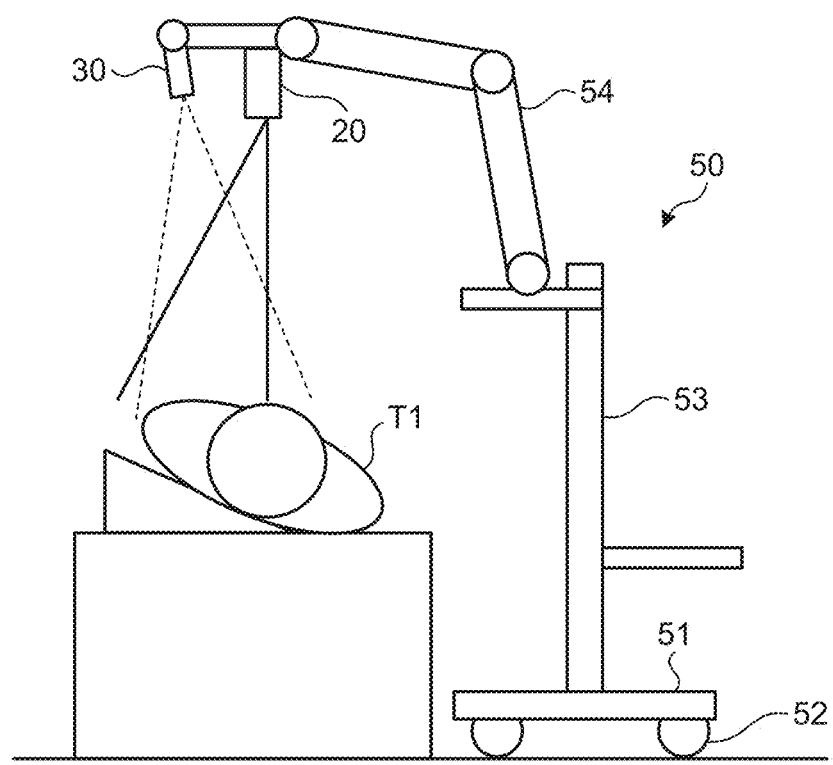
FIG. 3 is a diagram of exemplary setting of a projector and a camera according to the first embodiment.

The projector 20 and the camera 30 are, for example, as illustrated in FIG. 3, arranged above a patient T1 in a supine position and makes a projection and captures an image from above the patient T1. FIG. 3 is a diagram of exemplary setting of the projector 20 and the camera 30 according to the first embodiment. A stand 50 in FIG. 3 is for setting the projector 20 and the camera 30 and includes a base 51, casters 52, a support rod 53, and an arm 54. The base 51 is a member serving as the base of the stand 50 and the movable casters 52 is provided on the bottom surface of the base 51. The support rod 53 stands on and extends from the center of the base 51 and the arm 54 is attached to the top end of the support rod 53. The arm 54 is attached to the support rod 53 movably in the vertical and horizontal directions. The projector 20 and the camera 30 are attached to the tip of the arm 54 with their faces down. In the stand 50, the tip of the arm 54 is arranged above the patient T1 and this enables projection and image capturing from above the patent T1.

The projector 20 and the camera 30 are arranged with orientations to the patient T1 approximately the same as those at the time when the modality image is captured. The height of the arm 54, etc., are adjusted such that the area into which a projection is made by the projector 20 and the area of which image is captured by the camera 30 contain the site of the patient of which modality image has been captured.

Based on the input image (first image) that is input from the input device 10 and the captured image (second image) that is catered by the camera 30, the image processing device 40 generates a projection image for projection on which alignment has been performed. In the embodiment, the image processing device 40 is a specific computer (including a personal computer (PC) and a server device). Alternatively, the image processing device 40 may include multiple computers and multiple servers (cloud).

Figure 4:
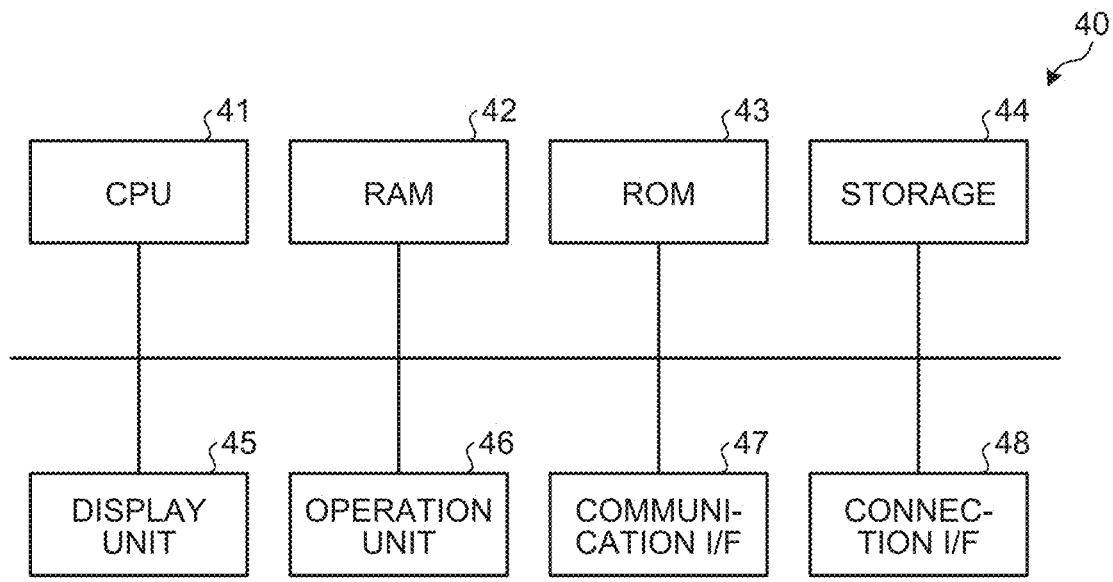
FIG. 4 is a diagram of an exemplary hardware configuration of an image processing device according to the first embodiment.

FIG. 4 is a diagram of an exemplary hardware configuration of the image processing device 40 according to the first embodiment. The image processing device 40 includes a central processing unit (CPU) 41, a random access memory (RAM) 42, a read only memory (ROM) 43, a storage 44, a display unit 45, an operation unit 46, a communication I/F 47, and a connection I/F 48.

The CPU 41 performs given control computation processing according to a program that is stored in the ROM 43 or the storage 44, using the RAM 42 as a working area. The storage 44 is a non-volatile memory and stores various types of programs and data.

The display unit 45 is formed of a display device, such as a liquid crystal display (LCD), and displays various types of information based on a display signal from the CPU 41. The operation unit 46 is formed of input devices, such as a keyboard and a mouse, and receives user operations. The operation unit 46 may be a touch panel that is formed on the screen of the display unit 45.

The communication I/F 47 is a device enabling transmission and reception of information to and from external devices via a network NT. The connection I/F 48 is a device enabling wired or wireless transmission and reception of information to and from external devices.

For example, the communication I/F 47 is connected to the input device 10 via a network NT and receives the input image that is transmitted from the input device 10. The connection I/F 48 is connected to the projector 20 and the camera 30 and transmits and receives image data between the projector 20 and the camera 30. The input device 10 may be configured to be connected via the connection I/F 48. The projector 20 and the camera 30 may be configured to be connected with each other via the communication I/F 47.

Figure 5:
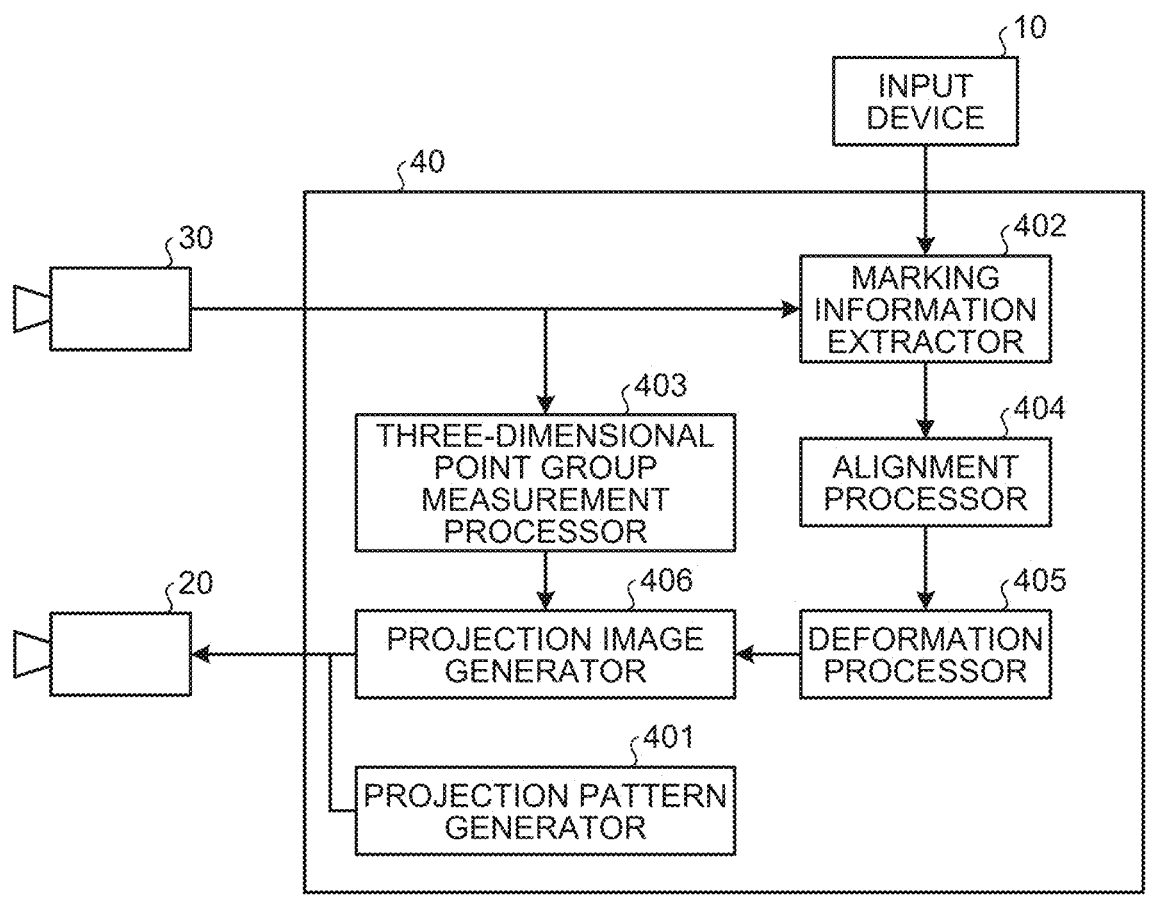
FIG. 5 is a diagram of an exemplary functional configuration of the image processing device according to the first embodiment.

FIG. 5 is a diagram of an exemplary functional configuration of the image processing device 40 according to the first embodiment. The image processing device 40 according to the present example includes a projection pattern generator 401, a marking information extractor 402, a three-dimensional point group measurement processor 403, an alignment processor 404, a deformation processor 405, and a projection image generator 406. The functional configuration is, for example, realized by the CPU 41 of the image processing device 40 and the program that is stored in the ROM 43 or the storage 44 in cooperation with each other. The alignment processor 404 and the deformation processor 405 are an exemplary image processor.

The projection pattern generator 401 generates pattern images for projection. The projection pattern generator 401 generates the following two types of pattern images. A first pattern image is a pattern image that is generally used for the purpose of measuring a three-dimensional shape (hereinafter, a shape measurement pattern), such as a gray code pattern, a phase shift image, or a hamming color code image. A second pattern image is an image pattern that is perfectly white or an image pattern that is perfectly black (a marking recognition patter below). The perfectly white marking recognition pattern is to be used as illumination light in a dark room without any room light. The projection pattern generator 401 may be configured not to generate any marking recognition pattern when, for example, there is a room light and thus it is possible to extract marking information with only external light.

The pattern images that are generated by the projection pattern generator 401 (the shape projection pattern and the marking recognition pattern) are input to the projector 20 and are projected by the projector 20 onto the projection target (the body surface BD1 of the patient) Images of the pattern images that are projected by the projector 20 are captured by the camera 30 and then are input as captured images to the image processing device 40. Among the captured images that are captured by the camera 30, the image of the shape measurement pattern is referred to as a "shape measurement image" and the image of the marking projection pattern is referred to as a "marking recognition image".

The marking information extractor 402 extracts marking information (marker types and marking positions) from each of the input image that is input from the input device 10 and the marking recognition image that is captured by the camera 30.

For example, as illustrated in FIG. 2A, when the types of markers are represented by shape, the marking information extractor 402 recognizes the shapes (types) of the markers like the ○ signs and x signs by pattern matching and extracts, as marking positions, pixel positions corresponding to the centers of the circles of the ○ signs and the intersections of the respective x signs.

For example, as illustrated in FIG. 2B, when the types of markers are represented by color, the marking information extractor 402 extracts color areas corresponding to the types of markers based on the hue, saturation, and value of each of the pixels forming the image data. Using eight-connected labeling in which color areas neighboring to the extracted color area and being in the same color as that of the extracted color area are labeled equally, or the like, the marking information extractor 402 clusters the color areas. The marking information extractor 402 then extracts, as a marking position, a set of barycentric coordinates of each of the clustered color areas is extracted as a marking position. The marking positions that are extracted from the marking recognition image are referred to as the "marking positions on the camera 30" and the marking positions that are extracted from the input image are referred to as the "marking positions on the input image".

The three-dimensional point group measurement processor 403 is an exemplary shape acquisition unit.

Based on the shape measurement images that are captured by the camera 30, the three-dimensional point group measurement processor 403 generates three-dimensional data representing the shape of the surface (three-dimensional shape) of the projection target (the body surface BD1 of the patient). Operations of the three-dimensional point group measurement processor 403 will be described below.

From the multiple shape measurement images that are acquired by the camera 30, the three-dimensional point group measurement processor 403 restores (decodes) the code values representing the sets of coordinates of pixels of the image that is projected by the projector 20 onto the body surface BD1 of the patient ("on the projector 20" below). Specifically, by examining the correspondence relationship between the code value of a pixel point (Xp,Yp) on the projector 20 and the code value of a pixel point (Xc,Yc) on the camera 30, the three-dimensional point group measurement processor 403 searches for the corresponding point.

It is possible to derive sets of three-dimensional coordinates (X,Y,Z) to be projected using a projector calibration parameter matrices (the product of an intrinsic parameter matrix and an extrinsic parameter matrix of the projector 20) that is obtained by the method by Zhang (Z. Zhang, "A flexible new technique for camera calibration," IEEE Transactions on Pattern Analysis and Machine Intelligence, 22, 11, pp. 1330-1334, 2000.) and a camera calibration parameter matrix (the product of an intrinsic parameter matrix and an extrinsic parameter matrix of the camera 30) obtained by the same method.

Equation (1) below is an equation representing a pixel point (Xp,Yp) on the projector 20 by a projector calibration parameter matrix. In Equation (1) below, Hp is a scaling factor. The right side of Equation (1) below is a projector calibration parameter matrix that is represented by the product of the intrinsic parameter matrix (P11 to P34) and the extrinsic parameter matrix (X, Y, Z and 1) of the projector 20. Equation (2) below is an equation representing a pixel point (Xc,Yc) on the camera 30 by a camera calibration parameter matrix. In Equation (2) below, Hc is a scaling factor. The right side of Equation (2) below is a camera calibration parameter matrix and is represented by the product of an intrinsic parameter matrix (C11 to C34) and an extrinsic parameter matrix (X, Y, Z and 1) of the camera 30.

$$\begin{bmatrix} H_p X_p \\ H_p Y_p \\ H_p \end{bmatrix} = \begin{bmatrix} P_{11} & P_{12} & P_{13} & P_{14} \\ P_{21} & P_{22} & P_{23} & P_{24} \\ P_{31} & P_{32} & P_{33} & P_{34} \end{bmatrix} \begin{bmatrix} X \\ Y \\ Z \\ 1 \end{bmatrix} \quad (1)$$

$$\begin{bmatrix} H_c X_c \\ H_c Y_c \\ H_c \end{bmatrix} = \begin{bmatrix} C_{11} & C_{12} & C_{13} & C_{14} \\ C_{21} & C_{22} & C_{23} & C_{24} \\ C_{31} & C_{32} & C_{33} & C_{34} \end{bmatrix} \begin{bmatrix} X \\ Y \\ Z \\ 1 \end{bmatrix} \quad (2)$$

Deleting the scaling factors Hp and Hc from the relations of Equation (1) and Equation (2) results in Equation (3) below.

$$\begin{bmatrix} C_{34}X_c - C_{14} \\ C_{34}Y_c - C_{24} \\ P_{34}X_p - P_{14} \\ P_{34}Y_p - P_{24} \end{bmatrix} = \quad (3)$$

$$\begin{bmatrix} (C_{11} - C_{31})X_c & (C_{12} - C_{32})X_c & (C_{13} - C_{33})X_c \\ (C_{21} - C_{31})Y_c & (C_{22} - C_{32})Y_c & (C_{23} - C_{33})Y_c \\ (P_{11} - P_{31})X_p & (P_{12} - P_{32})X_p & (P_{13} - P_{33})X_p \\ (P_{21} - P_{31})Y_p & (P_{22} - P_{32})Y_p & (P_{23} - P_{33})Y_p \end{bmatrix} \begin{bmatrix} X \\ Y \\ Z \end{bmatrix}$$

Solving Equation (3) by a pseudo-inverse matrix enables calculation of three-dimensional point coordinates (X,Y,Z) representing the shape of the surface of the projection target. Executing the above-described processing on each pixel makes it possible to obtain three-dimensional data representing a three-dimensional shape of the projection target (the body surface BD1 of the patient) (a three-dimensional point group P{($X_p$,$Y_p$i, $Z_{pi}$) where Pi is a pixel number}). As illustrated in FIG. 6, in the coordinate system of the three-dimensional data, the origin is projection light of the projector 20, the X axis is the horizontal direction of the projector 20, the Y axis is the vertical direction of the projector 20 and the Z axis is the direction in which a projection is made by the projector 20. FIG. 6 is a diagram for explaining the coordinate system of the three-dimensional data according to the first embodiment.

The above-described case is an example where a resolution in the case where code values in both vertical and horizontal directions are generated is obtained. Alternatively, a configuration in which any one of the vertical and horizontal directions is used may be used because identifying any one of lines in the vertical direction and the horizontal direction of the projector coordinates makes it possible to uniquely calculate a three-dimensional point group P by a pseudo-inverse matrix.

The alignment processor 404 is an exemplary alignment processing unit. The alignment processor 404 executes image processing to, based on the marking positions of the first type markers M1 that are extracted by the marking information extractor 402, align the marking positions of the first type markers contained in the input image with the marking positions of the first type markers contained in the marking recognition image.

Figure 7A:
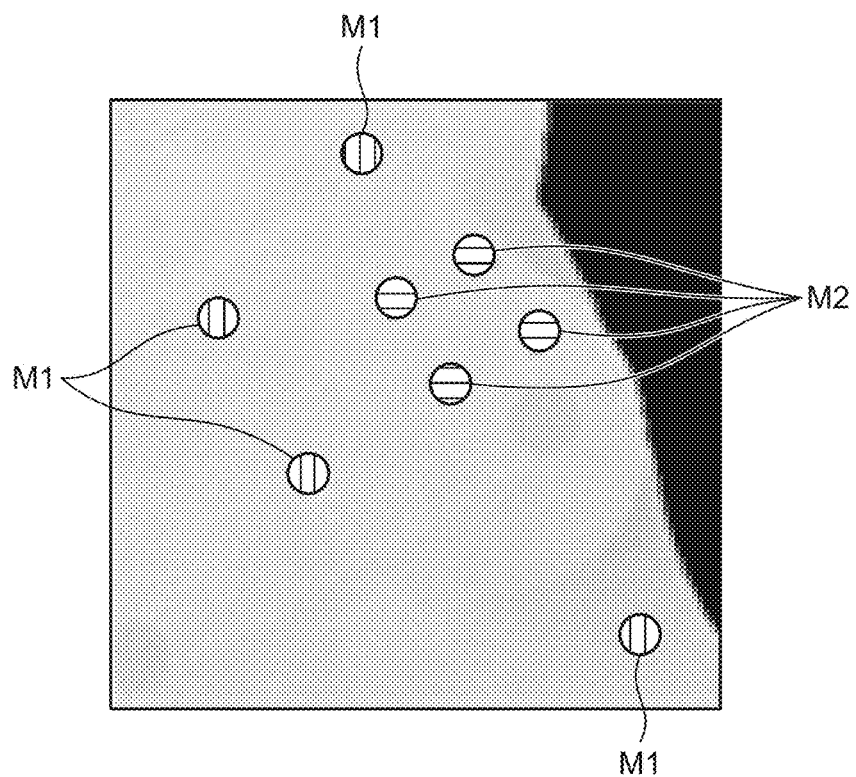
FIGS. 7A and 7B are diagrams of exemplary states of marking with markers contained in an input image and in a marking recognition image according to the first embodiment.
Figure 7B:
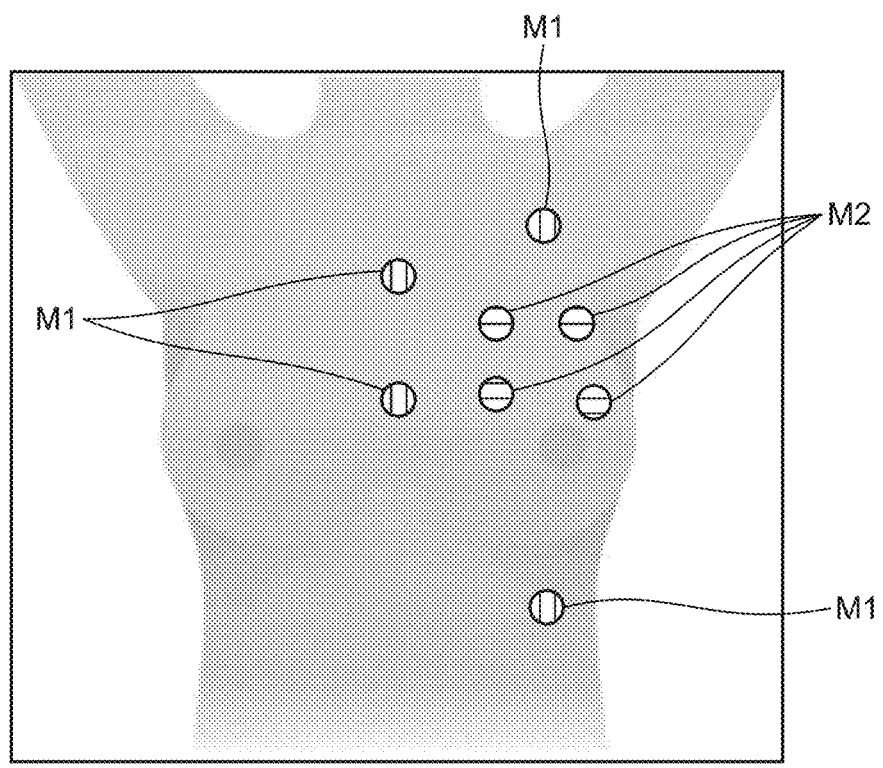

According to the following descriptions, the state of marking with the markers contained in an input image is as illustrated in FIG. 7A and the state of marking with the markers contained in a marking recognition image is as illustrated in FIG. 7B. FIGS. 7A and 7B are diagrams of exemplary states of marking with the markers contained in the input image and in the marking recognition image according to the first embodiment.

Four marking positions of the first type markers M1 among the marking positions on the marking recognition image that are extracted by the marking information extractor 402 are represented as a point group $P_{cg}\{(X_{cg1}, Y_{cg1}), (X_{cg2}, Y_{cg2}), (X_{cg3}, Y_{cg3}), (X_{cg4}, Y_{cg4})\}$. In the same manner, four marking positions of the first type markers M1 among the marking positions on the input image that are extracted by the marking information extractor 402 are represented as a point group $P_{mg}\{(X_{mg1},Y_{mg1}), (X_{mg2}, Y_{mg2}), (X_{mg3},Y_{mg3}), (X_{mg4},Y_{mg4})\}$.

First of all, based on the three-dimensional point group coordinates (X,Y,Z) that are derived by the three-dimensional point group measurement processor 403, the alignment processor 404 acquires each coordinate in the three-dimensional space as a point group $PC_g\{(XC_{g1}, YC_{g1}, ZC_{g1}), (XC_{g2}, YC_{g2}, ZC_{g2}), (XC_{g3}, YC_{g3}, ZC_{g3}), (XC_{g4}, YC_{g4}, ZC_{g4})\}$. The point group $PC_g$ is derived during the process performed by the three-dimensional point group measurement processor 403.

Based on the point group $P_{mg}$ and the coordinate system of the three-dimensional space (see FIG. 6), the alignment processor 404 defines the point group $P_{mg}$ on the input image as the point group $PM_q((X_{mg1}, Y_{mg1}, Z_0), (X_{mg2}, Y_{mq2}, Z_0), (X_{mg3}, Y_{mg3}, Z_0), (X_{mg4}, Y_{mg4}, Z_0)$
where $Z_0$ may be any value. In the example, $Z_0=0$ is set to enable parallelism with the plane of the projector. This reflects an intention to make a parallel projection from the same direction of the viewpoint because the modality image to be projected is information on a plane.

On receiving the point group $PC_q$ and the point group $PM_g$, the alignment processor 404 executes Procrustes analysis to estimate transformation parameters (an amount of scaling, a rotational angle, and an amount of shift) to align the X and Y coordinate positions of the point group $PM_g$ with the X and Y coordinate positions of the point group $PC_g$.

The alignment processor 404 calculates a scaling count b, a rotational matrix T, and a translation matrix c as transformation parameters, using Equation (4) below, where Y is a matrix representing the point group $PM_g$ and Z is a matrix representing the point group $PC_g$.

$$Z=bYT+c \qquad (4)$$

The alignment processor 404 applies the calculated transformation parameters (the scaling count b, the rotational matrix T, and the translation matrix c) to the whole area (all the pixels) of the input image as in the case of the point group $P_{mg}$ (point group $PM_g$), thereby executing liner transformation processing on the input image. Accordingly, the alignment processor 404 generates the input image after alignment obtained by performing alignment based on the marking positions of the first type markers as a post-alignment image (coordinate group $PM_{reg}\{(X_{mi},X_{mi},Z_0)$ where mi is a pixel number}).

The deformation processor 405 is an exemplary deformation process unit. The deformation processor 405 executes image processing to align the marking positions of the second type markers contained in the input image with the marking positions of the second type markers contained in the marking recognition image.

Four marking positions of the second type markers M2 among the marking positions on the input image that are extracted by the marking information extractor 402 are represented as a point group $PM_b\{(X_{mb1}, Y_{mb1}, Z_0), (X_{mb2}, Y_{mb2}, Z_0), (X_{mb3}, Y_{mb3}, Z_0), (X_{mb4}, Y_{mb4}, Z_0)\}$. Four marking positions (point group $P_{cb}$) of the second type markers M2 among the marking positions on the marking recognition image that are extracted by the marking information extractor 402 are represented as a point group $PC_b\{(XC_{b1}, YC_{b1}, ZC_{b1}), (XC_{b2}, YC_{b2}, ZC_{b2}), (XC_{b3}, YC_{b3}, ZC_{b3}), XC_{b4}, YC_{b4}, ZC_{b4})\}$. The point group $PM_b$ and the point group $PC_b$ are derived in the same manner as that in which the above-described point group $PM_g$ and the point group $PC_g$ are derived.

First of all, the deformation processor 405 extracts a deformation area on which a deformation process is to be performed. The deformation processor 405 sets a minimum rectangular area A0 containing the point group $PM_b$ on the X-Y plane containing the point groups PM (the point group $PM_g$ and the point group $PM_b$). The deformation processor 405 further sets a rectangular area A1 with a given margin in the width direction and the height direction of the rectangular area A0 outside the rectangular area A0. The deformation processor 405 extracts any one of the rectangular areas A0 and A1, which are set, as the deformation area AC.

The amount of margin serves as a parameter to determine to what extent the deformation process is performed outside the rectangular area A0. Any amount of margin is set; however, it is preferable that the amount of margin be changed according to the site onto which a projection is made and the use. For example, a configuration in which an amount of margin is set automatically from a distance by which the rectangular area A0 and the point group $PM_q$ around the rectangular area A0 separate from each other may be used. When it is previously determined that the rectangular area A0 be extracted as the deformation area AC, setting the rectangular area A1 is unnecessary.

Figure 8A:
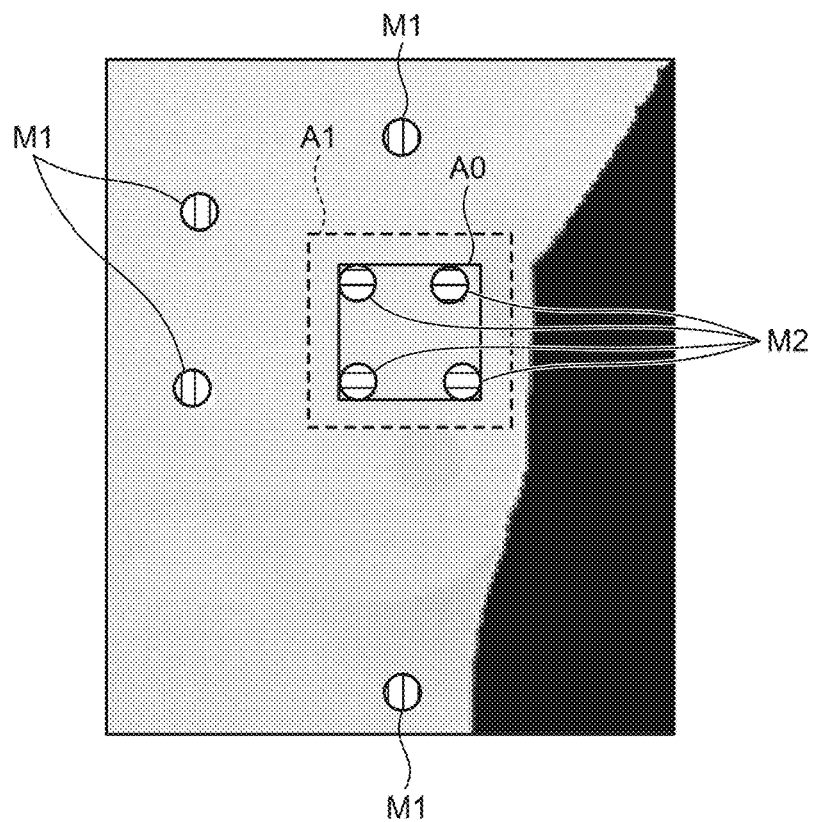
FIGS. 8A and 8B are diagrams for explaining an operation of extracting a deformation area that is performed by a deformation processor according to the first embodiment.
Figure 8B:
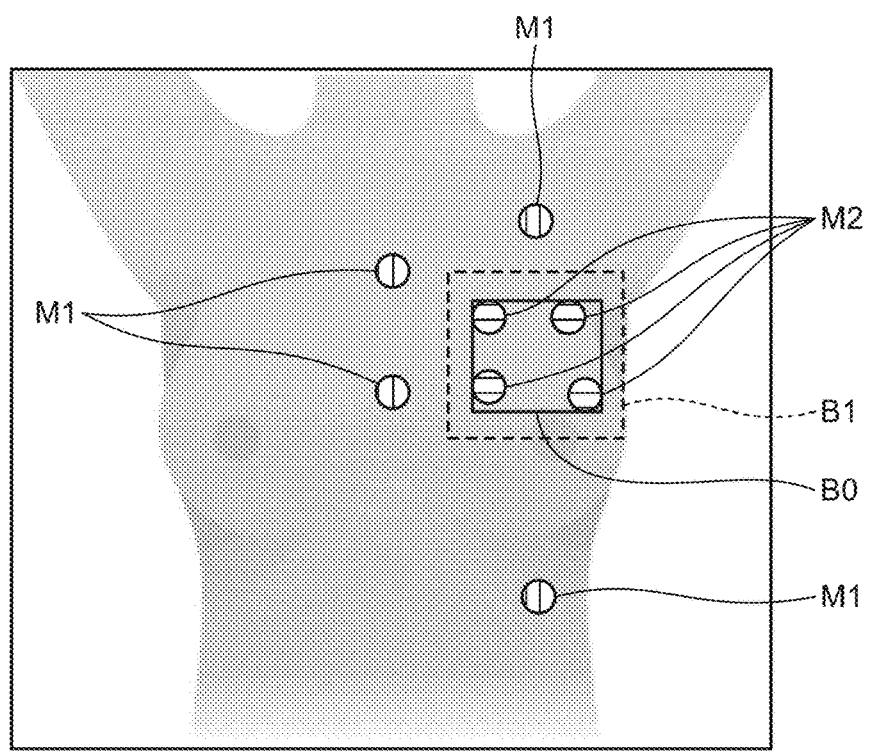

Similarly, as for the point group $PC_b$, the deformation processor 405 sets a minimum rectangular area B0 containing the point group $PC_b$ on the X-Y plane containing point groups PC (the point group $PC_g$ and the point group $PC_b$) and a rectangular area B1 with a given margin in the rectangular area B0 (see FIG. 8B). The deformation processor 405 extracts any one of the rectangular areas B0 and B1, which are set, as the deformation area BC. When the deformation area AC does not contain part of the area of the deformation area BC, the deformation processor 405 extracts, as a deformation area, a rectangular area AC' that is set such that a rectangular area AC' contains part of the deformation area BC.

FIGS. 8A and 8B are diagrams for explaining an operation of extracting a deformation area that is performed by the deformation processor 405 according to the first embodiment. As illustrated in FIG. 8A, the deformation processor 405 sets a minimum rectangular area A0 containing four second type markers M2 on the X-Y plane containing the point group PM. The deformation processor 405 further sets a rectangular area A1 with a given margin with respect to the rectangular area A0.

As illustrated in FIG. 8B, the deformation processor 405 sets a minimum rectangular area B0 containing four second type markers M2 on the X-Y plane containing the point group PC. The deformation processor 405 further sets a rectangular area B1 with a given margin with respect to the rectangular area B0.

When the rectangular area A0 servers as the deformation area AC, the rectangular area B0 is extracted as the deformation area BC. When the rectangular area A1 servers as the deformation area AC, the rectangular area B1 is extracted as the deformation area BC. For the amount of margin to set the rectangular area B1, it is preferable that a value corresponding to the amount of margin in the rectangular area A1 be set based on the size ratio of the rectangular area A0 and the rectangular area B0.

Based on the X and Y coordinates on the X-Y plane containing the point group PM and the X and Y coordinates on the X-Y plane containing the point group PC, the deformation processor 405 derives a displacement field for deforming the shape of the deformation area AC into the shape of the deformation area BC. When the deformation area AC' is extracted, based on the X and Y coordinates on the X-Y plane containing the point group PM and the X and Y coordinates on the X-Y plane containing the point group PC, the deformation processor 405 derives a displacement field for approximation to the shape of the deformation area AC'.

Specifically, the deformation processor 405 generates a given number of grid points in the deformation area AC by sectioning the deformation area AC into a grid. The number of grid points is determined according to the resolution of the projector 20, the sizes of the deformation area AC and the deformation area BC, etc. A grid point group consisting of grid points that are formed in the deformation area AC (Lw grid points in the width direction (X-axis direction)×Lh grid points in the height direction (Y-axis direction)) will be represented by $LP(\{X_{lpi}, Y_{lpi}\}$ where i is 1 to Lw and j is 1 to Lh}.

When $LPH\{(XH_{lpi}, YH_{lpj})$ where i is 1 to L1 and j is 1 to Lh} obtained by applying the displacement field to the grid point group LP serves as a displacement field coordinate group, for example, the grid point area formed by $(X_{lp1}, Y_{lp1})$, $(X_{lp1}, Y_{lp2})$, $(X_{lp2}, Y_{lp1})$ and $(X_{lp2}, Y_{lp2})$ of the grid point group LP is regarded as being projected onto the grid point area that is formed by $(XH_{lp1}, YH_{lp1})$, $(XH_{lp1}, YH_{lp2})$, $(XH_{lp2}, YH_{lp1})$ and $(XH_{lp2}, YH_{lp2})$ of the displacement field coordinate group LPH. Thus, the deformation processor 405 calculates a projective transformation (homography transformation) $H_{lp1,lp1}$ that is calculated from the points as a displacement field of the grid point area of $(X_{lp1}, Y_{lp1})$, $(X_{lp1}, Y_{lp2})$, $(X_{lp2}, Y_{lp1})$ and $(X_{lp2}, Y_{lp2})$.

The deformation processor 405 performs the above-described calculation of a displacement field on each grid point area forming the deformation area AC, thereby acquiring a projective transformation $H_{lpi,lpj}$ (i is 1 to Lw-1 and j is 1 to Lh-1) for the whole area of the deformation area AC.

For the coordinate group $PM_{Leq}$ of the post-alignment image, the deformation processor 405 selects the projective transformation $H_{lpi,lpj}$ corresponding to the area containing the X and Y coordinates thereof and executes non-linear transformation processing. Accordingly, the deformation processor 405 generates a post-deformation image (the post-deformation coordinate group $PMD_{reg}\{(X_{mi}, Y_{mi}, Z_{mi})$ where mi is a pixel number) obtained by aligning the input image (post-alignment image) based on the marking positions of the second type markers.

The projection image generator 406 generates image data for projection (projection image below) based on three-dimensional data (three-dimensional point group P) obtained by the three-dimensional point group measurement processor 403 and the post-transformation image (the post-transformation coordinate group $PMD_{reg}$) that is generated by the deformation processor 405.

The projection image generator 406 calculates a value $Z_{mi}$ of a Z coordinate of each point of the post-deformation coordinate group $PMD_{reg}$. As described above, $Z_{mi}$ of the post-deformation coordinate group $PMD_{reg}$ at this time point is $Z_0 (Z_{mi}=Z_0)$. The positional relationship between the post-deformation coordinate group $PMD_{reg}$ and the surface of the projection target (the body surface BD1 of the patient) is as illustrated in FIG. 9 representing the state where a move in the Z-axis direction that is the direction of the optical axis of the projector 20 enables mapping the post-deformation coordinate group $PMD_{reg}$ onto the body surface BD1 of the patient. FIG. 9 is a diagram of a relationship between the post-deformation coordinate group $PMD_{reg}$ and the body surface BD1 of the patient according to the first embodiment.

The projection image generator 406 searches for each point of the post-deformation coordinate group $PMD_{reg}$ in the Z-axis direction and, when there is a point satisfying $(X_{mi}, Y_{mi})=(X_{pi}, Y_{pi})$, executes mapping processing satisfying $(X_{mi}, Y_{mi}, Z_{mi}=Z_{pi})$ using a value $Z_{pi}$ of a Z coordinate of the three-dimensional point group P.

The searching method is not particularly limited and it is possible to use various methods, such as calculating $Z_{mi}$ by the nearest neighbor algorithm or by plane or curve approximation from a point group in an area in a specified size containing a point $(X_{mi}, Y_{mi}, Z_{mi})$. Even when there is a point satisfying $(X_{mi}, Y_{mi})=(X_{pi}, Y_{pi})$, the method using plane or curve approximation may be used. When there is not any matching point, a neighboring point group is searched. When a point $(X_{mi}, Y_{mi}, Z_{mi})$ is in a position outside the measurement area, there is not any corresponding three-dimensional point group P and thus the point may be excluded as noise or a point that is not projectable.

The projection image generator 406 transforms the post-deformation coordinate group $PMD_{reg}$ in which the value of $Z_{mi}$ is determined into a coordinate system of the image data that the projector 20 projects (a projector coordinate system below). Specifically, by Equation (1) above, a corresponding projector coordinate group $P_m\{(X_{pmi}, Y_{pmi})$ where i is a pixel number} is calculated from each coordinate of the post-deformation coordinate group $PMD_{reg}$.

The post-deformation coordinate group $PMD_{reg}$ is mapped discretely onto the projector coordinate system and thus the luminance (or color) information on the corresponding area is also discrete and accordingly an intermittent pixel occur. The projection image generator 406 then executes a process to interpolate the intermittent pixel. Complementing the intermittent pixel will be described below with reference to FIG. 10.

FIG. 10 is a diagram of a relationship between a coordinate system CS1 of the post-deformation coordinate group PMDeg and a projector coordinate system CS2 according to the first embodiment. As illustrated in FIG. 10, the input image (modality image) that is used in the first embodiment consists of pixels (w pixels in the horizontal direction×h pixels in the vertical direction) and each of the pixels has a luminance value when the image is a grayscale image or has color information (RGB value) when the image is a color image.

Three points $(X0_p, Y0_p)$, $(X1_p, Y0_p)$ and $(X0_p, Y1_p)$ on the projector coordinate system corresponding to three points (X0,Y0), (X1,Y0) and (X0,Y1) on the input image form a triangular area. For example, when an intermittent pixel is contained in the triangular area, the projection image generator 406 interpolates the intermittent pixel by linear interpolation using the luminance values (or color information) corresponding to distances from the three points $(X0_p, Y0_p)$, $(X1_p, Y0_p)$ and $(X0_p, Y1_p)$.

The above-described method generates a point group for all the pixels and thus, as the number of pixels increases, the process load increases. To deal with this, the projection image generator 406 may interpolate the intermittent pixel, for example, by the following method.

Presume that the coordinate system of the input image consists of grid points (w grid points in the width direction×h grid points in the longitudinal direction). In the above-described transformation process, each set of coordinates of the post-deformation coordinate group $PMD_{reg}$ is regarded as being mapped as grid points representing the input image onto the projector coordinate system. In this case, as illustrated in FIG. 10, a projective transformation (homography transformation) H to project four points (X0, Y0), (X1,Y0), (X0,Y1) and (X1,Y1) forming the grid area of the input image onto four points (X0, Y0), $(X1_p, Y0_p)$, $(X0_p,Y1_p)$ and $(X1, Y1_p)$ of the projector coordinate system can be calculated.

When the four points into which the four points are transformed form a rectangle with a concave part as illustrated in FIG. 10, the projective transformation H does not enable projection onto the inside of the rectangle and therefore it is preferable that whether the rectangle has a concave part be determined in advance. When the rectangle has a concave part, it suffices if the rectangle is divided into triangles (for example, a set of $(X0_p,Y0_p)$, $(X1_p,Y0_p)$ and $(X0_p,Y1_p)$ and a set of $(X1_p,Y1_p)$, $(X1_p,Y0_p)$ and $(X0_p, Y1_p)$) and a projective transformation (affine transformation) is calculated for each of the triangles. Furthermore, projective transformations for triangles may be calculated for all the grid points.

When a homography transformation or an affine transformation is used, an intermittent pixel occur; however, it suffices if the intermittent pixel be interpolated by the nearest neighbor algorithm, bilinear interpolation, bicubic interpolation, or the like. Through the above-described process, the projection image generator 406 generates an image for projection. The image for projection that is generated by the projection image generator 406 is output to the projector 20 and is then projected onto the patient who is the projection target. In the image for projection that is projected as described above, the marking positions of the first type markers M1 and the marking positions of the second type markers M2 are represented in a state of approximately matching the marking positions of the first type markers M1 and the second type markers M2 that are put on the patient.

Figure 12:
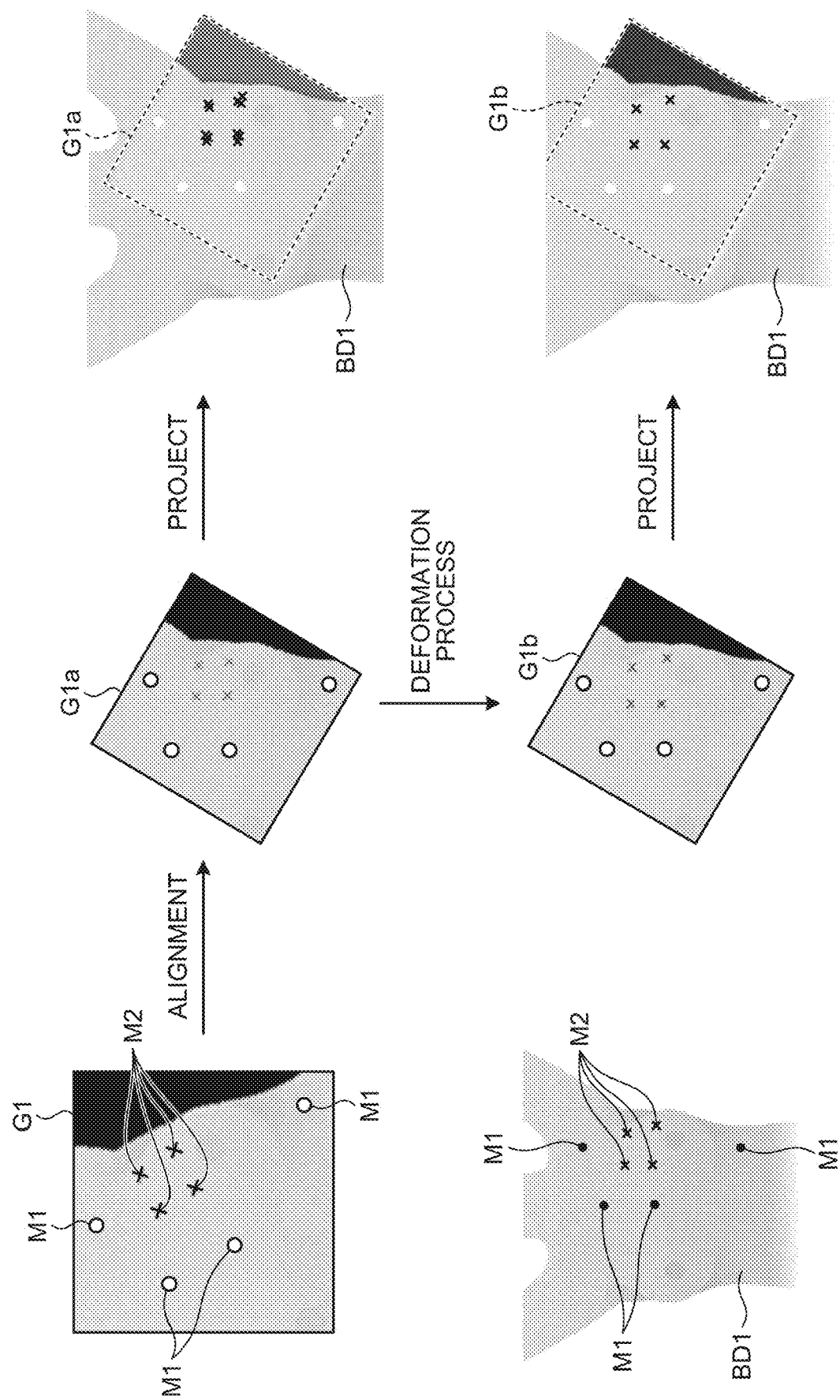
FIG. 12 is a diagram for explaining the image processing that is executed by the image processing device according to the first embodiment.

With reference to FIGS. 11 and 12, operations of the image processing device 40 will be described. FIG. 11 is a flowchart of exemplary image processing that is executed by the image processing device 40 of the first embodiment. FIG. 12 is a diagram for explaining the image processing that is executed by the image processing device 40 according to the first embodiment.

First of all, an input image G1 with marking information is input from the input device 10 (step S11). The input image G1 that is input is stored in a recording medium, such as the RAM 42 or the storage 44. The timing of inputting the input image is not particularly limited and the input image may be input when the image is captured with a modality or right before the projector 20 makes a projection.

On generating pattern images for projection, the projection pattern generator 401 outputs the pattern images for projection to the projector 20 to project the pattern images onto the body surface BD1 of the subject (step S12). The marking information extractor 402 acquires a marking recognition image that is captured by the camera (step S13) and extracts (acquires) marking positions of each marker type from the marking recognition image (step S14). The marking information extractor 402 extracts (acquires) the marking positions of each marker type from the input image (step S15).

On the other hand, based on a shape measurement image that is captured by the camera 30, the three-dimensional point group measurement processor 403 generates three-dimensional data (three-dimensional point group P) representing the shape of the surface of a projection target (step S16).

The alignment processor 404 specifies marking positions of the first type markers M1 (point group $PC_g$) in a three-dimensional space corresponding to the marking positions (point group $P_{cg}$) on the camera coordinates (step S17). By executing Procrustes analysis, the alignment processor 404 calculates transformation parameters to transform the marking positions (point group $P_{mg}$) of the first type markers M1 on the input image into marking positions (point group $PC_g$) in the three-dimensional space (step S18). By linearly transforming all the pixel positions of the input image using the calculated transformation parameters, the alignment processor 404 acquires a post-alignment image G1a (coordinate group $PM_{reg}$) that is the input image after alignment (step S19).

The post-alignment image G1a is an image obtained by performing alignment based on the first type markers M1 and matches the marking positions of the first type markers M1 that are put on the body surface BD1 of the patient. Note that, as for varying sites, even when the same posture as that at the time when the input image G1 (modality image) is captured is reproduced at projection, there is a possibility that the shape may differ. In this case, even when the post-alignment image G1 is projected, the marking positions of the second type markers M2 do not match (as illustrated in the upper right image in FIG. 12) and the post-alignment image G1 is inappropriate as the projection image for projection mapping. Thus, the deformation processor 405 executes a process for aligning the marking positions of the second type markers M2 in the following process.

On the X-Y plane representing the input image G1 and the marking recognition image by a coordinate system of a three-dimensional space, the deformation processor 405 extracts rectangular areas containing the second type markers M2 as deformation areas AC and BC (step S20). The deformation processor 405 then calculates a displacement field to deform the deformation area AC that derives from the input image G1 into the deformation area BC that derives from the marking recognition image (or a deformation area AC') (step S21). By deforming the post-alignment image G1a (coordinate group $PM_{Le9}$) using the calculated displacement field (non-linear transformation), the deformation processor 405 acquires a post-deformation image G1b (post-deformation coordinate group $PMD_{reg}$) that is the input image G1 after deformation (step S22).

Based on the three-dimensional data (three-dimensional point group P), the projection image generator 406 sets a Z value of the post-deformation image G1b to map the post-deformation image G1b onto the body surface BD1 of the patient (step S23). The projection image generator 406 transforms the mapped image into a projector coordinate system of the projector 20 (step S24). The projection image generator 406 interpolates an intermittent pixel that occurs due to transformation into the projector coordinate system (step S25) to generate a projection image for projection (step S26). The projection image generator 406 then outputs the generated projection image to the projector 20 (step S27) to cause the projector 20 to project the projection image and ends the process.

Accordingly, as illustrated in the lower right diagram in FIG. 12, the projection image (the post-deformation image Gib) aligned with the marking positions of the first type markers M1 and the second type markers M2 that are put on the body surface BD1 of the patient is projected onto the body surface BD1 of the patient.

As described above, according to the projection system 1 (the image processing device 40), even when a projection is made onto a non-rigid object, such as a human body, alignment is performed by different methods between a non-varying site and a varying site based on the marking positions of the first type markers and the second type markers and thus it is possible to generate a projection image corresponding to the shape of the surface of and flexibility of a projection target. Accordingly, the projection system 1 (the image processing device 40) enables generation of a projection image that is preferable to projection mapping onto a non-rigid object, such as a human body.

Other embodiments will be described with reference to the accompanying drawings. Some components that produce the same or similar effects as or to those of the first embodiment will be denoted with the same reference numerals and descriptions thereof will be omitted.

Second Embodiment

In the first embodiment, the example where the projection image (modality image) is projected onto the chest (near breasts) has been described; however, the site onto which a projection is made is not limited to this. In the second embodiment, an example where another site serves as a projection target onto which a projection is made will be described.

Figure 13:
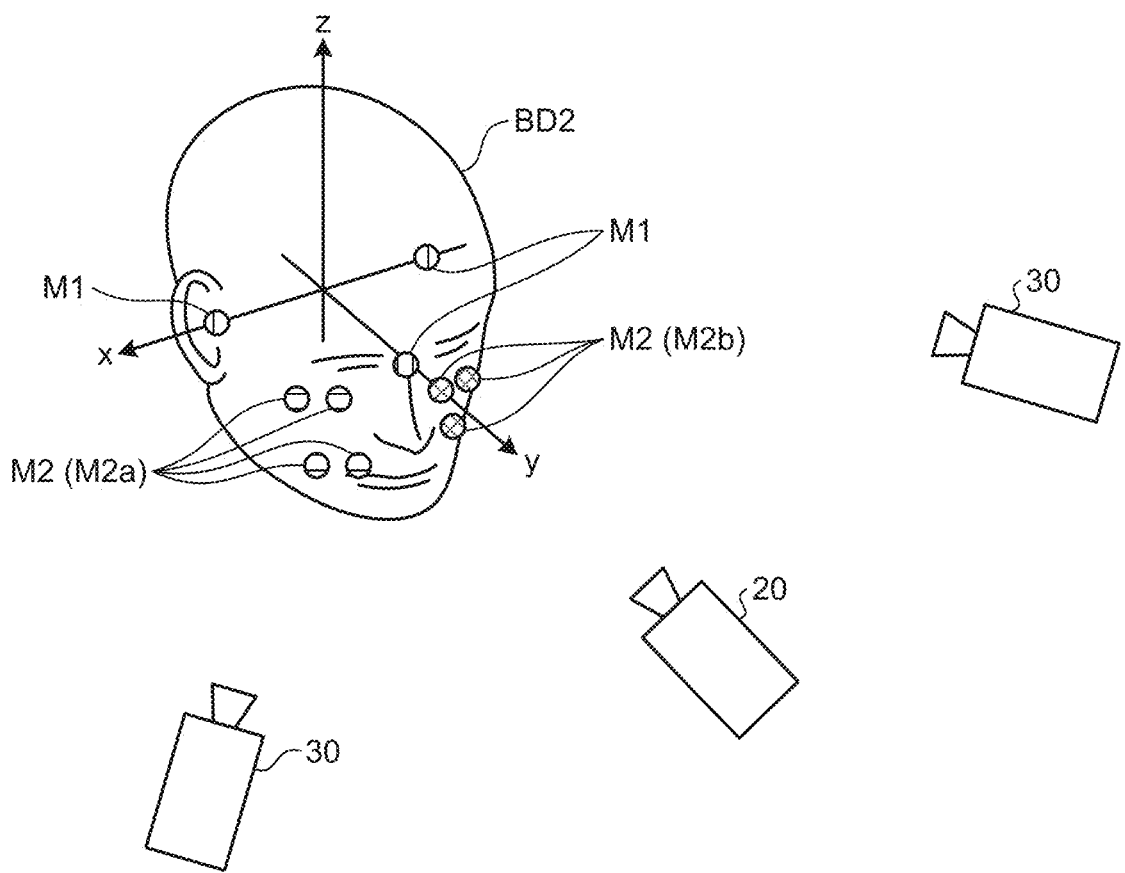
FIG. 13 is a diagram of an exemplary object onto which a projection is made.

FIG. 13 is a diagram of an exemplary object serving as a projection target according to the second embodiment, illustrating a head BD2 of a human body. Also when the head BD2 serves as a projection target, the marking positions of the first type markers M1 and the second type markers M2 are the same as those in the first embodiment. Specifically, sites with low flexibility (for example, anatomical reference, such as the bases of the ears or the bridge) are marked with the first type markers M1 and sites with high flexibility (for example, the cheeks) are marked with the second type markers M2.

According to FIG. 13, the right and left cheeks are marked with the second type markers M2 in different modes (M2a and M2b). This is because the left cheek and the right cheek are independent of each other with the nose in between serving as a non-varying area and as the boundary. In this case, by separately extracting the marking positions of the first type markers M2a and the second type markers M2b and performing the above-described deformation process, it is possible to execute alignment based on the second type markers M2a and M2 on each of the left and right cheeks.

When all the markers cannot be captured from a single viewpoint (the single projector 20 or the single camera 30), a configuration in which multiple projectors 20 and multiple cameras 30 are used may be employed. FIG. 13 illustrates an example where two cameras 30 are arranged respectively on the left and right of the projector 20 that is arranged in front of the face. Also in this case, as in the first embodiment, fixing and calibrating the positional relationship between the projector 20 and the camera 30 makes it possible to deal with data in a standardized three-dimensional space. This is applicable to, in addition to the head, various types of sites, such as the abdomen, back, waist or foot.

Third Embodiment

In the first embodiment, the example where the four first type markers M1 and the four second type marker M2 are put has been described; however, the number of markers is not limited thereto. In a third embodiment, exemplary operations performed when another number of markers are put will be described.

First of all, when at least three first type markers M1 and at least three second type markers M2 are put, it is possible to generate a projection image by the same process as that of the first embodiment. Not that when three second type markers M2 are put, the deformation processor 405 performs alignment (deformation process) based on the second type markers M2 using linear affine transformation instead of the non-liner projective transformation.

Even when two first type markers M1 and one second type marker M2 are put, it is possible to perform alignment according to the following method. First of all, on the first type markers M1, as in the first embodiment, alignment is executed by liner mapping based on the two marking positions of the first type markers M1. On the other hand, in alignment based on the second type marker M2, a given weight is given to the first type markers M1 to regard the first type markers M1 as the second type marker M2. Then, non-linear projective transformation or linear affine transformation is performed based on the total three marking positions of the first type markers M1 and the second type marker M2 to execute alignment (deformation process) based on the second type marker M2. As described above, it is possible to generate a projection image if there are two first type markers M1 at minimum and one second type marker M2 at minimum.

The deformation processor 405 may be configured not to perform alignment when less than two first type markers M1 are put because setting is unnecessary and to make a notification indicating that alignment is not to be performed via the display unit 45, the projector 20, or the like.

Fourth Embodiment

In the first embodiment, the alignment processor 404 is configured to calculate transformation parameters for alignment based on the marking positions (a point group $P_{cg}$) of the first type markers M1 that are extracted from the captured image of the camera 30 and the marking positions (a point group $P_{mg}$) of the first type markers M1 that are extracted from the input image of the input device 10. The configuration enables projection in a preferable condition when the orientations of the projector 20 and the patient have the same arrangement relationship (angle of arrangement).

Figure 14:
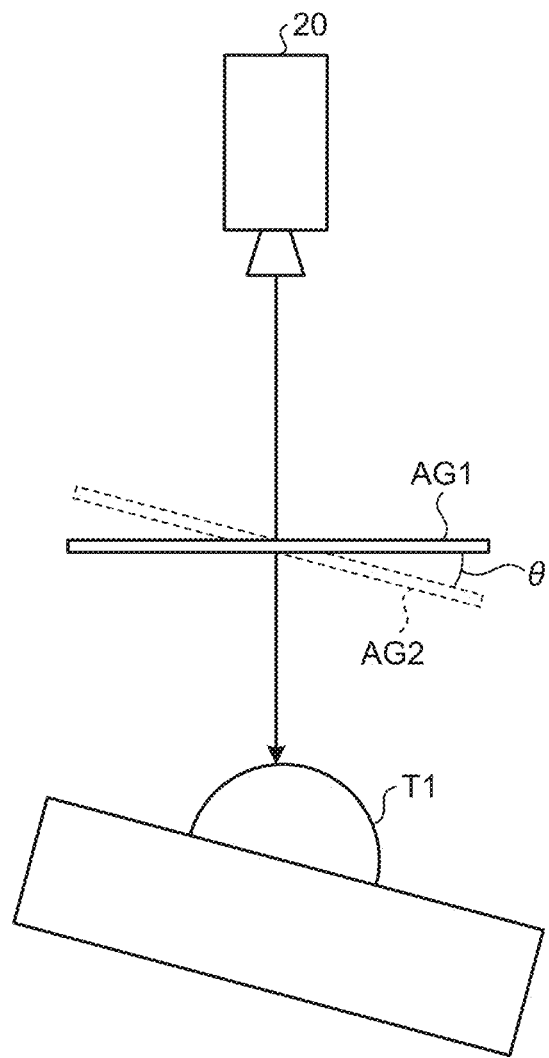
FIG. 14 is a diagram for explaining a relationship in arrangement between a projector and an object onto which a projection is made according to a fourth embodiment.

FIG. 14 is a diagram for explaining an arrangement relationship between the projector 20 and the object (patient T1) that is a projection target. According to FIG. 14, an ideal arrangement relationship is realized when the optical axis of the projector 20 that is arranged opposing to the patient T1 is orthogonal to the angle at which the patient T1 is arranged (arrangement angle AG1).

It is however assumed that an error would occur in the arrangement relationship between the projector 20 and the patient when a projection is made while the stand 50 is moved or the level of the arm 54 is changed. The state of the arrangement angle AG2 in FIG. 14 represents the state where the arrangement angle between the projector 20 and the patient T1 shifts by θ degrees.

In the fourth embodiment, a mode enabling alignment covering three-dimensional rotational components in order to take the shift in arrangement angle into consideration will be described. First of all, in order to model the state where the arrangement angle shifts, it is defined that the shifted angle between the Y axis and the Z axis of the coordinate system illustrated in FIG. 9 is θ and the shifted angle between the X axis and the Y axis is φ, and θ and φ correct the point group $P_{mg}$ within a given range and the corrected point group $P_{mg}$ is a point group $Q_{mg}$.

It is possible to calculate the point group $Q_{mg}$ based on the following Equation (5), where $R_x(\theta)$ and $R_y(\varphi)$ are members to which the shifted angles θ and φ are taken into consideration and are represented by Equations (6) and (7)

$$Q_{mg} = R_x(\theta)R_y(\phi)P_{mg} \quad (5)$$

$$R_x(\theta) = \begin{bmatrix} 1 & 0 & 0 \\ 0 & \cos\theta & -\sin\theta \\ 0 & \sin\theta & \cos\theta \end{bmatrix} \quad (6)$$

$$R_y(\phi) = \begin{bmatrix} \cos\phi & 0 & \sin\phi \\ 0 & 1 & 0 \\ -\sin\phi & 0 & \cos\phi \end{bmatrix} \quad (7)$$

In this case, the alignment processor 404 performs Procrustes analysis, which is aforementioned, using the X and Y coordinate positions obtained by the point group $Q_{mg}$ instead of the point group $PM_q$. In Procrustes analysis, Z (point group $PC_g$) that minimizes the Euclidean distance is calculated using Equation (4) above. A total sum of the Euclidean distances of the respective point groups serving as an evaluation value is calculated for each combination of θ and φ and thus calculating Equation (4) using θ and φ that minimize the evaluation value derives a coordinate group $PM_{Leq}$ of the post-alignment image.

θ and φ are set in a small range of few ±degrees containing 0 degrees. Under the circumstance where θ and φ increase, it is considered that the input image does not accord with the positional relationship with the projection target and therefore it is not possible to make a projection in an appropriate state. When the range of θ and φ exceeds a threshold, that is, when the error of transformation exceeds the threshold, the image processing device 40 (for example, the alignment processor 404) may determine that the positional relationship between the projector 20 and the projection target is inappropriate and make a notification indicating the fact via the display unit 45, the projector 20, or the like. Accordingly, it is possible to make a notification indicating misalignment between the input image (modality image) and the site of the patient onto which the input image is projected and thus improve usability and prevent a medical act from being performed based on an erroneous input image.

Fifth Embodiment

In the first embodiment, the example where the non-varying site and the varying site are marked with the two types of markers (the first type markers M1 and the second type markers M2) has been described; however, the types of markers are not limited to two types. In a fifth embodiment, an exemplary configuration in which three types of markers are used will be described.

FIG. 15 is a diagram illustrating exemplary markers according to the fifth embodiment, illustrating an example where marking is performed using three types of markers. First type markers M1 are, for example, green markers with which non-varying sites are marked as in the first embodiment. Second type markers M2 are, for example, blue markers with which varying sites are marked as in the first embodiment. Third type markers M2 are, for example, red markers in a mode where the third type markers are differentiated from the first type markers M1 and the second type markers M2.

Figure 15A:
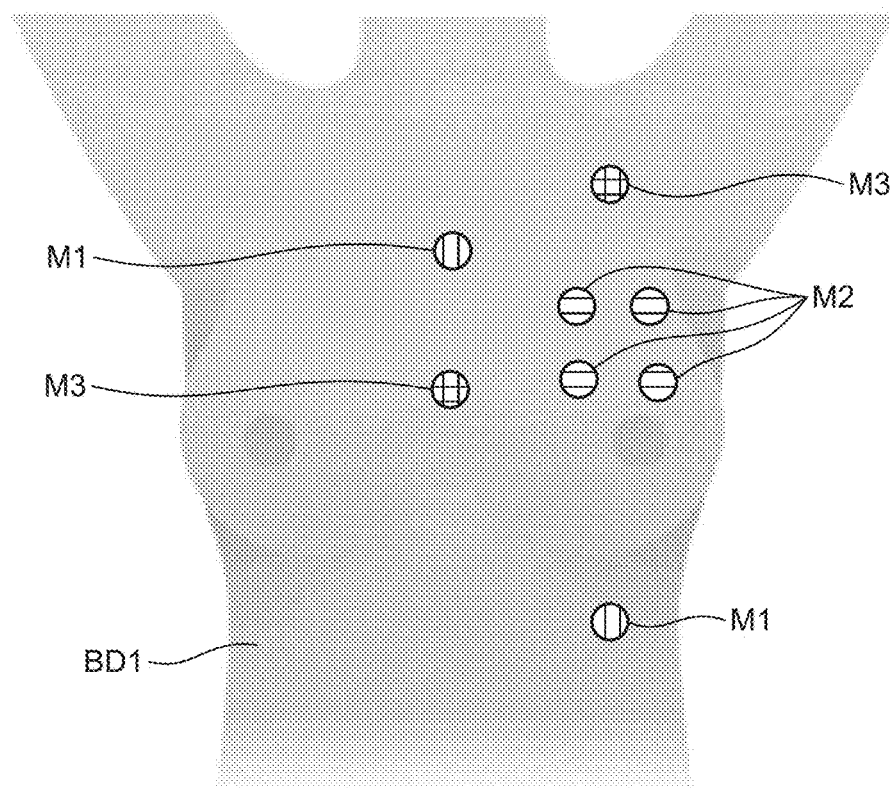
FIGS. 15A and 15B are diagrams of exemplary markers according to a fifth embodiment.

FIG. 15A illustrates an example where the third type markers M3 are put on sites with flexibility higher than that of the non-varying sites on which the first type markers M1 are put (that tend to vary) and lower than that of varying sites on which the second type markers M2 are put (that tend not to vary).

Figure 15B:
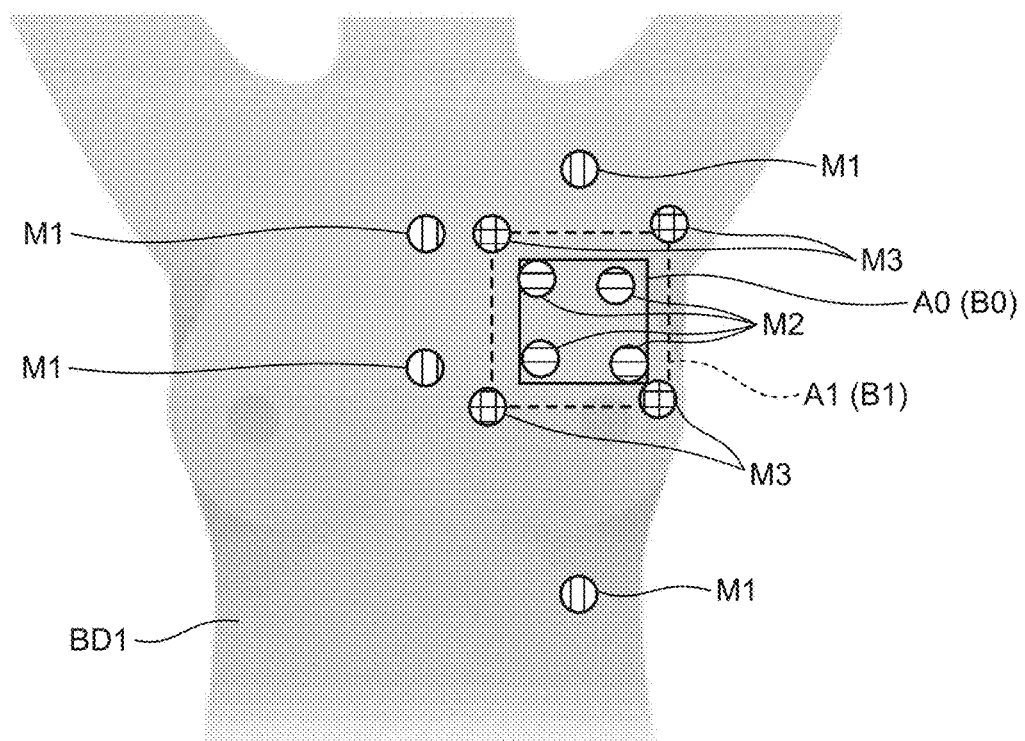

FIG. 15B illustrates an example where positions corresponding to a rectangular area A1 (or B1) on the body surface BD1 of a patient are marked with the third type markers M3. As described above, the positions corresponding to the rectangular area A1 (or B1) may be marked with the third type markers M3. In this case, based on the marking positions of the third type markers M3, it is possible to specify the rectangular area A1 (and B1) or a deformation area AC (and BC).

When the third type markers M3 are used, any one of the alignment processor 404 and the deformation processor 405 is able to execute alignment based on the marking positions of the third type markers M3. In the fifth embodiment, the example where the alignment processor 404 performs the alignment will be described.

First of all, as in the first embodiment, the marking positions of the first type markers M1 contained in an input image serve as a point group $P_{mg}$ and the marking positions of the first type markers M1 contained in a marking recognition image that is captured by the camera 30 serve as a point group $P_{cg}$. Furthermore, the marking positions of the third type markers M3 contained in the input image serve as a point group $P_{nr}$ and the marking positions of the third type markers M3 contained in the marking recognition image serve as a point group $P_{cr}$.

When the third type markers M3 are used, the alignment processor 404 executes Procrustes analysis using the point group $P_{cg}$ and the point group $P_{cr}$. The alignment processor 404 increases the number of samples of the point group $P_{mr}$ and the point group $P_{cr}$ by a weight coefficient α (integer) and executes Procrustes analysis, thereby increasing the binding effect of the third markers M3. When a weight coefficient between the point group $P_{cg}$ and the point group $P_{mg}$ is 3, the values α and β may be adjusted to adjust the ratio in binding effect between the first type markers M1 and the third markers M3.

Sixth Embodiment

The above-described embodiments employ the configuration to extract marking information (marker types and marking positions) from an input image and data that is captured by the camera 30 (marking recognition image). Note that a situation where it is difficult to automatically extract marking information from the image data would be assumed depending on the environment of use. Thus, in a sixth embodiment, a configuration enabling a user to specify marking positions and marker types in image data via the operation unit 46, or the like, will be described.

Specifically, the image processing device 40 (for example, the marking information extractor 402) displays both or any one of an input image and a marking recognition image that is captured by the camera 30 on the display unit 45 and receives an operation of specifying marking positions and marker types in the images (marking operation) via the operation unit 46. The marking information extractor 402 acquires, as marking information, the marking position and the marker types that are specified from the image. Accordingly, according to the sixth embodiment, even under a circumstance where it is difficult to automatically extract markers, it is possible to perform the same process as that of the first embodiment based on the marking positions and the marker types that are specified by the user and thus generate a preferable projection image.

Seventh Embodiment

In the first embodiment, the configuration in which the three-dimensional point group measurement processor 403 generates three-dimensional data (three-dimensional point group P) representing the body surface BD1 of the patient has been described. In a seventh embodiment, an exemplary configuration enabling omission of the three-dimensional point group measurement processor 403 will be described.

Figure 16:
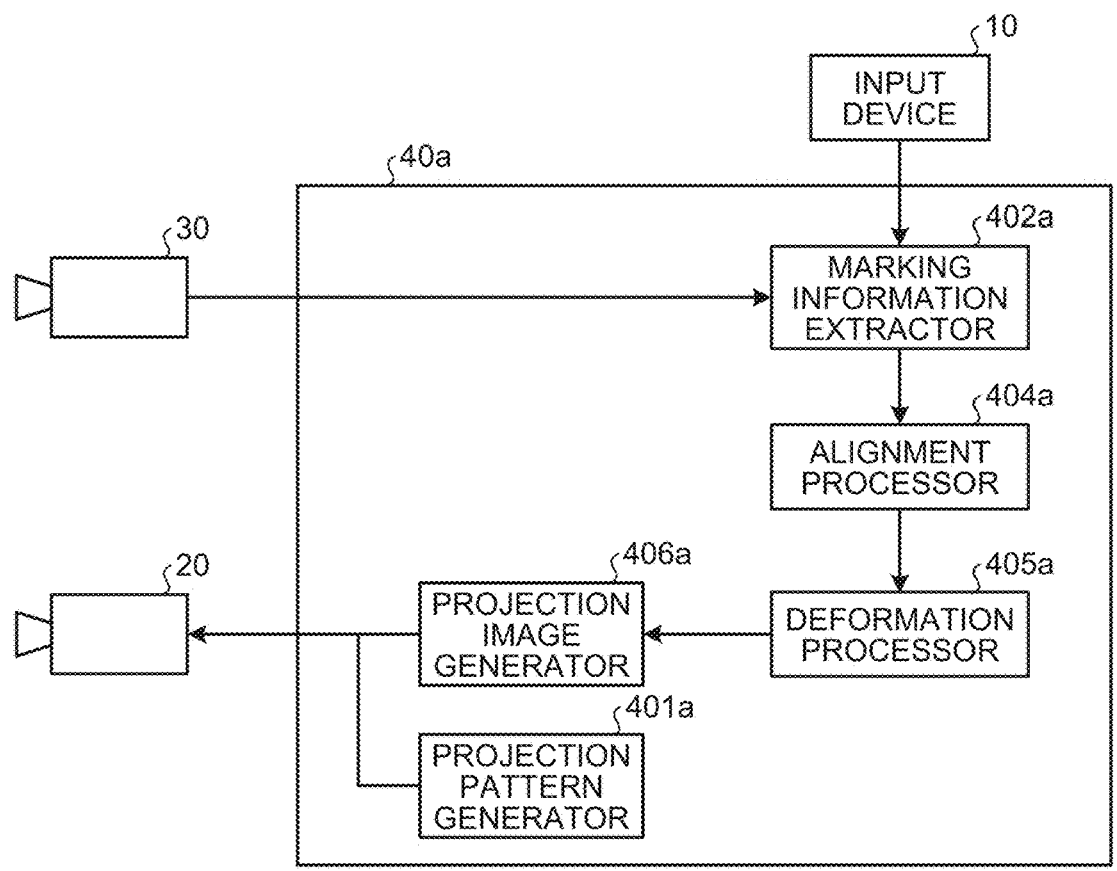
FIG. 16 is a diagram of an exemplary functional configuration of an input device according to a seventh embodiment.

FIG. 16 is a diagram illustrating an exemplary functional configuration of an image processing device 40a according to the seventh embodiment. As illustrated in FIG. 16, the image processing device 40a has a configuration obtained by excluding the three-dimensional point group measurement processor 403 from the functional configuration of the image processing device 40 illustrated in FIG. 5. The image processing device 40a includes a projection pattern generator 401a, a marking information extractor 402a, an alignment processor 404a, a deformation processor 405a, and a projection image generator 406a instead of the projection pattern generator 401, the marking information extractor 402, the alignment processor 404, the deformation processor 405, and the projection image generator 406.

In general, the projector 20 and the camera 30 are reduction optical systems and it is necessary to sufficiently keep a distance from an object from which effects of perspective projection are excluded in three-dimensional measurement. The seventh embodiment is an exemplary configuration under ideal circumstances without such a hardware limitation. The ideal circumstances are, for example, that, in projection onto the body surface BD1 of the patient that is a projection target, the projector 20 and the camera 30 are arranged in parallel above the patient such that the projector 20 and the camera 30 are equally oriented and a sufficient distance is kept between the optical systems and the patient.

Figure 17:
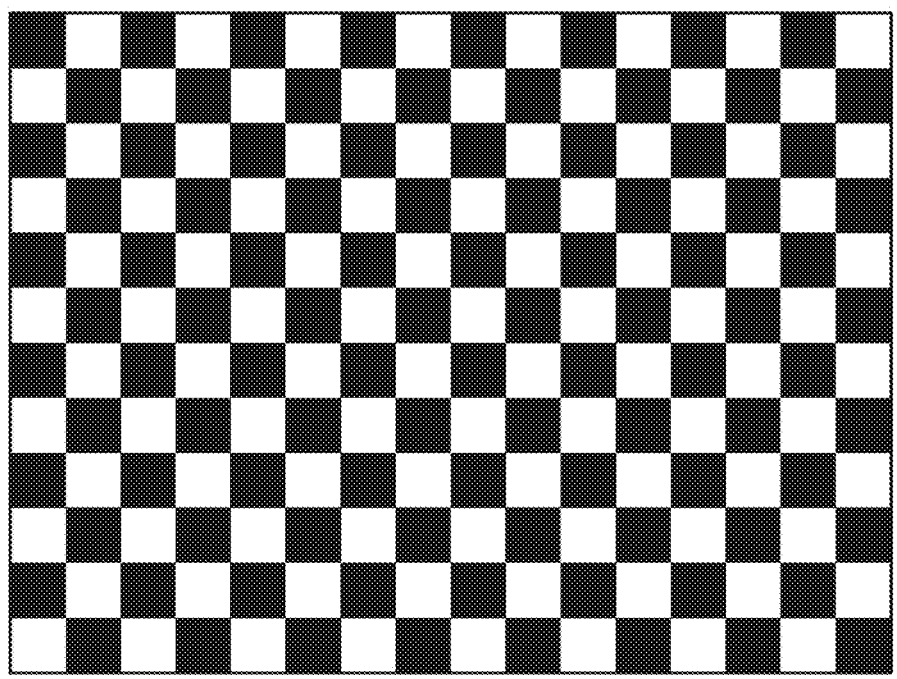
FIG. 17 is a diagram of an exemplary shape measurement pattern according to the seventh embodiment.

The projection pattern generator 401a generates, as a shape measurement pattern, a grid pattern forming a checked pattern like that illustrated in FIG. 17. As the projection pattern generator 401 does, the projection pattern generator 401a generates a marking recognition pattern. FIG. 17 is a diagram of an exemplary shape measurement pattern according to the seventh embodiment.

The pattern images (a grid pattern and a marking recognition pattern) that are generated by the projection pattern generator 401a are projected by the projector 20 onto the body surface BD1 of the patient. The state of the grid pattern that is projected onto the body surface of the patient is captured in an image by the camera 30.

The marking information extractor 402a extracts a point group $P_{cg}$ and a point group $P_{mg}$ representing marking positions of the first type markers M1 from a marking recognition image that is captured by the camera 30 and an input image that is input from the input device 10. The marking information extractor 402a extracts a point group $P_{cb}$ and a point group $P_{mb}$ representing marking positions of the second type markers M2 from the marking recognition image and the input image.

The alignment processor 404a then calculates a point group $P_{cgp}$ and a point group $P_{mgp}$ that represent position coordinates on projector coordinates corresponding to the point group $P_{cg}$ and the point group $P_{mg}$. For example, by using an inverse projective transformation $H_i^{-1}$ of a projective transformation $H_i$ corresponding to the grid containing the point group $P_{cg}$, it is possible to specify corresponding positions on the projector coordinates. Thus, $H_i^{-1}P_{cg}$ obtained by applying the inverse projective transformation $H_i^{-1}$ to the point group $P_{cg}$ serves as a reference (point group $P_{cgp}$) for alignment on the projection image. The alignment processor 404a specifies, for the point group $P_{cb}$, the corresponding position coordinates (the point group $P_{cbp}$) on the projector coordinates.

Using the point group $P_{mgp}$ and the point group $P_{cgp}$, the alignment processor 404a calculates transformation parameters to transform the point group $P_{mg}$ into position coordinates of the point group $P_{cgp}$ by Procrustes analysis. The alignment processor 404a calculates coordinate positions that are calculated by applying the transformation parameters to $P_{mb}$, using the transformation parameters, as a point group $P_{cbreg}$. Accordingly, the input image is arranged on the projector coordinates at that time and a post-alignment image is acquired.

The deformation processor 405a then performs a deformation process to cause the point group $P_{cbreg}$ to correspond to coordinate positions of the point group $P_{cbp}$. The deformation processor 405 of the first embodiment performs deformation in a three-dimensional space; however, in this case, a deformation process is performed on the projector coordinates and therefore a displacement field is generated in the projector space. It is possible to generate the displacement field as in the first embodiment. The deformation processor 405a generates a post-deformation image by applying the generated displacement field to the post-alignment image.

The projection image generator 406a generates a projection image by applying the above-escribed projective transformation $H_i$ to the post-deformation image that is generated by the deformation processor 405a. Thus, according to the image processing device 10a according to the seventh embodiment, it is possible to generate a projection image that is aligned according to the shape of the surface of and flexibility of the projection target and therefore, as in the first embodiment, it is possible to provide a projection image preferable to projection mapping.

The embodiments of the present invention have been described; however, the above-described embodiments are represented as examples and are not to limit the scope of the invention. The new embodiments can be carried out in other various modes and various omissions, replacements, changes and combinations may be made within the scope of the invention. The embodiments and modifications are covered by the scope of the invention and are covered by the scope of the invention described in the claims and equivalents of the invention.

According to an embodiment, it is possible to generate a projection image that is preferable to projection mapping onto a non-rigid object.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. An image processing device comprising:
a marking information extractor to, for a target area including a plurality of sites having different flexibilities, a plurality of markers of types corresponding to the respective flexibilities being put on the plurality of sites, extract marking positions, the plurality of markers being put in the marking positions according to each type of the plurality of markers, from each of a first image, that is to be projected and that is an image of the target area captured in advance, and a second image that is an image of the target area captured before projection of the first image;
an image processor to, based on the marking positions extracted according to each of the types of the plurality of markers, execute image processing to align the marking positions of the markers contained in the first image with the marking positions of the markers contained in the second image by a processing method corresponding to the types of the plurality of markers; and
a projection image generator to, based on the first image after the image processing, generate a projection image to be projected onto the target area,
wherein the image processor includes:
an alignment processor to, based on the plurality of marking positions of first type markers put on a non-varying site with relatively low flexibility, perform by linear transformation, the image processing to align the plurality of marking positions of the first type markers contained in the first image with the plurality of marking positions of the first type markers contained in the second image; and
a deformation processor to, based on the plurality of marking positions of second type markers put on a varying site with relatively higher flexibility than flexibility of the non-varying site, perform by non-linear transformation, the image processing to align the plurality of marking positions of the second type markers contained in the first image and the plurality of marking positions of the second type markers contained in the second image.

2. The image processing device of claim 1, further comprising a shape acquisition unit to acquire a shape of a surface of the target area from the second image,
wherein
the alignment processing unit is configured to perform the liner transformation on a whole of the first image such that the plurality of marking positions of the second type markers contained in the first image are marking positions on the shape of the surface corresponding to the plurality of marking positions of the first type markers extracted from the second image, and
the deformation process unit is configured to perform the non-liner transformation on part of the first mage after the liner-transformation such that the plurality of marking positions of the second type markers contained in the first image after the liner transformation are marking positions on the shape of the surface corresponding to the plurality of marking positions of the second type markers extracted from the second image.

3. The image processing device of claim 1, wherein the alignment processing unit is configured to execute alignment of the first type markers covering three-dimensional rotation.

4. The image processing device of claim 1, wherein the alignment processing unit is configured to make a notification of an error of transformation of the first type markers, after alignment exceeds a threshold.

5. The image processing device of claim 1, further comprising:
a display unit to display at least one of the first image and the second image; and
an operator, to receive a marking operation of marking the image displayed on the display unit with the markers whose marker type, is specified,
wherein the marking information extractor is configured to extract the marking positions of the plurality of markers put by the marking operation according to each of the types of the plurality of markers.

6. A projection system comprising:
an input unit to, for a target area including a plurality of sites having different flexibilities, a plurality of markers of types corresponding to the respective flexibilities being put on the plurality of sites, input a first image that is to be projected and that is an image of the target area;
an image capturing unit to capture an image of the target area to generate a second image;
a marking information extractor to extract marking positions, the plurality of markers being put in the marking positions according to each type of the plurality of markers from each of the first image and the second image;
an image processor to, based on the marking positions extracted according to each of the types of the plurality of markers, execute image processing to align the marking positions of the plurality of markers put on the first image with the marking positions of the plurality of markers put on the second image, by a processing method corresponding to the types of the plurality of markers;

a projection image generator to, based on the first image after the image processing, generate a projection image to be projected onto the target area; and a projection unit to project the projection image onto the target area, wherein the image processor includes:

an alignment processor to, based on the plurality of marking positions of first type markers put on a non-varying site with relatively low flexibility, perform by linear transformation, the image processing to align the plurality of marking positions of the first type markers contained in the first image with the plurality of marking positions of the first type markers contained in the second image; and a deformation processor to, based on the plurality of marking positions of second type markers put on a varying site with relatively higher flexibility than flexibility of the non-varying site, perform by non-linear transformation, the image processing to align the plurality of marking positions of the second type markers contained in the first image and the plurality of marking positions of the second type markers contained in the second image.

7. The projection system of claim 6, further comprising:
a shape acquisition unit to acquire a shape of a surface of the target area from the second image, wherein the alignment processor is configured to perform the liner transformation on a whole of the first image such that the plurality of marking positions of the second type markers contained in the first image are marking positions on the shape of the surface corresponding to the plurality of marking positions of the first type markers extracted from the second image, and the deformation processor is configured to perform the non-liner transformation on part of the first mage after the liner-transformation such that the plurality of marking positions of the second type markers contained in the first image after the liner transformation are marking positions on the shape of the surface corresponding to the plurality of marking positions of the second type markers extracted from the second image.

8. The projection system of claim 6, wherein
the alignment processor is configured to execute alignment of the first type markers covering three-dimensional rotation.

9. The projection system of claim 6, wherein the alignment processor is configured to make a notification of an error of transformation of the first type markers, after alignment exceeds a threshold.

10. The projection system of claim 6, further comprising:
a display to display at least one of the first image and the second image; and an operator, to receive a marking operation of marking the image displayed on the display unit with the markers whose marker type, is specified, wherein the marking information extractor is configured to extract the marking positions of the plurality of markers put by the marking operation according to each of the types of the plurality of markers.

* * * * *